US012112761B2

(12) United States Patent
Shlomot et al.

(10) Patent No.: US 12,112,761 B2
(45) **Date of Patent: *Oct. 8, 2024**

(54) AUDIO SIGNAL ENCODING METHOD AND APPARATUS

(71) Applicant: Huawei Technologies Co., Ltd., Shenzhen (CN)

(72) Inventors: Eyal Shlomot, Long Beach, CA (US); Jonathan Alastair Gibbs, Cumbria (GB); Haiting Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,975

(22) Filed: Aug. 18, 2023

(65) Prior Publication Data

US 2023/0395084 A1 Dec. 7, 2023

Related U.S. Application Data

(63) Continuation of application No. 17/962,878, filed on Oct. 10, 2022, now Pat. No. 11,776,553, which is a (Continued)

(30) Foreign Application Priority Data

Jun. 29, 2018 (CN) ......................... 201810713020.1

(51) Int. Cl.
*G10L 19/008* (2013.01)
*G10L 19/038* (2013.01)
(Continued)

(52) U.S. Cl.
CPC .......... *G10L 19/008* (2013.01); *G10L 19/038* (2013.01); *G10L 19/06* (2013.01); *G10L 19/032* (2013.01); *G10L 19/07* (2013.01)

(58) Field of Classification Search
CPC ...... G10L 19/008; G10L 19/032; G10L 19/07
See application file for complete search history.

(56) References Cited

U.S. PATENT DOCUMENTS 6,393,392 B1 * 5/2002 Minde ..................... G10L 19/16 704/219
7,013,269 B1 * 3/2006 Bhaskar ................ G10L 19/097 704/219

(Continued)

FOREIGN PATENT DOCUMENTS

CA 2997332 A1 3/2017
CN 101335000 A 12/2008

(Continued)

OTHER PUBLICATIONS

Shoham, "Coding the Line Spectral Frequencies by Jointly Optimized MA Prediction and Vector Quantization," IEEE, 1999. (Year: 1999).*

(Continued)

*Primary Examiner* — Feng-Tzer Tzeng
(74) *Attorney, Agent, or Firm* — Conley Rose, P.C.

(57) ABSTRACT

An encoding method includes determining an adaptive broadening factor based on a quantized line spectral frequency (LSF) vector of a first channel of a current frame of an audio signal and an LSF vector of a second channel of the current frame, and writing the quantized LSF vector and the adaptive broadening factor into a bitstream.

20 Claims, 9 Drawing Sheets

Related U.S. Application Data continuation of application No. 17/135,548, filed on Dec. 28, 2020, now Pat. No. 11,501,784, which is a continuation of application No. PCT/CN2019/093403, filed on Jun. 27, 2019.

(51) Int. Cl.

| | |
|---|---|
| ***G10L 19/06*** | (2013.01) |
| *G10L 19/032* | (2013.01) |
| *G10L 19/07* | (2013.01) |

(56) References Cited

U.S. PATENT DOCUMENTS

| | | | | |
|---|---|---|---|---|
| 10,937,435 | B2 * | 3/2021 | Fueg | G10L 21/04 |
| 2003/0014249 | A1 * | 1/2003 | Ramo | G10L 19/07<br>704/E19.025 |
| 2010/0010811 | A1 | 1/2010 | Zhou et al. | |
| 2010/0280823 | A1 | 11/2010 | Shlomot et al. | |
| 2011/0054885 | A1 | 3/2011 | Nagel et al. | |
| 2013/0301835 | A1 * | 11/2013 | Briand | H04S 7/00<br>381/17 |
| 2015/0049872 | A1 * | 2/2015 | Virette | G10L 19/008<br>381/23 |
| 2016/0247508 | A1 | 8/2016 | Dick et al. | |
| 2016/0314797 | A1 | 10/2016 | Vasilache et al. | |
| 2017/0365266 | A1 | 12/2017 | Helmrich et al. | |

FOREIGN PATENT DOCUMENTS

| | | | | |
|---|---|---|---|---|
| CN | 101933087 | A | 12/2010 | |
| CN | 102243876 | A | 11/2011 | |
| CN | 105336333 | A | 2/2016 | |
| CN | 105593931 | A | 5/2016 | |
| CN | 107592938 | A | 1/2018 | |
| WO | 2010086194 | A1 | 8/2010 | |
| WO | WO-2017049399 | A1 * | 3/2017 | G10L 19/002 |
| WO | 2017125544 | A1 | 7/2017 | |
| WO | 2018086947 | A1 | 5/2018 | |

OTHER PUBLICATIONS

Kang, et al., "Low-Complexity Predictive Trellis-Coded Quantization of Speech Line Spectral Frequencies," IEEE Transactions on Signal Processing, Jul. 2004. (Year: 2004).*

Bernd Edler, et al., "Audio Coding Using a Psychoacoustic Pre- and Post-Filter ," 2000 IEEE International Conference on Acoustics, Speech, and Signal Processing. Proceedings (Cat. No. 00CH37100), Aug. 2002, 4 Pages.

Gong Zhu, "Design And Implention of Low Bit Rate Speech Coding Algorithm Based on CELP," Xidian University, 2016, Issue 04, 2 pages (abstract).

Kang, et al., "Low-Complexity Predictive Trellis-Coded Quantization of Speech Line Spectral Frequencies," IEEE Transactions on Signal Processing, Jul. 2004, 10 pages.

Shoham, "Coding the Line Spectral Frequencies by Jointly Optimized MA Prediction and Vector Quantization," IEEE, 1999, 3 pages.

* cited by examiner

AUDIO SIGNAL ENCODING METHOD AND APPARATUS

CROSS-REFERENCE TO RELATED APPLICATIONS

This is a continuation of U.S. patent application Ser. No. 17/962,878 filed on Oct. 10, 2022, which is a continuation of U.S. patent application Ser. No. 17/135,548 filed on Dec. 28, 2020, now U.S. Pat. No. 11,501,784, which is a continuation of International Patent Application No. PCT/CN2019/093403 filed on Jun. 27, 2019, which claims priority to Chinese Patent Application No. 201810713020.1 filed on Jun. 29, 2018. All of the aforementioned patent applications are hereby incorporated by reference in their entireties.

TECHNICAL FIELD

This disclosure relates to the audio field, and more specifically, to a stereo signal encoding method and apparatus, and a stereo signal decoding method and apparatus.

BACKGROUND

In a time-domain stereo encoding method, an encoder side first performs inter-channel time difference estimation on a stereo signal, performs time alignment based on an estimation result, then performs time-domain downmixing on a time-aligned signal, and finally separately encodes a primary channel signal and a secondary channel signal that are obtained after the downmixing, to obtain an encoded bitstream.

Encoding the primary channel signal and the secondary channel signal may include determining a linear prediction coefficient (LPC) of the primary channel signal and an LPC of the secondary channel signal, respectively converting the LPC of the primary channel signal and the LPC of the secondary channel signal into a line spectral frequency (LSF) parameter of the primary channel signal and an LSF parameter of the secondary channel signal, and then performing quantization encoding on the LSF parameter of the primary channel signal and the LSF parameter of the secondary channel signal.

A process of performing quantization encoding on the LSF parameter of the primary channel signal and the LSF parameter of the secondary channel signal may include quantizing the LSF parameter of the primary channel signal to obtain a quantized LSF parameter of the primary channel signal, and performing reusing determining based on a distance between the LSF parameter of the primary channel signal and the LSF parameter of the secondary channel signal, and if the distance between the LSF parameter of the primary channel signal and the LSF parameter of the secondary channel signal is less than or equal to a threshold, determining that the LSF parameter of the secondary channel signal meets a reusing condition, that is, quantization encoding does not need to be performed on the LSF parameter of the secondary channel signal, but a determining result is to be written into a bitstream. Correspondingly, a decoder side may directly use the quantized LSF parameter of the primary channel signal as a quantized LSF parameter of the secondary channel signal based on the determining result.

In this process, the decoder side directly uses the quantized LSF parameter of the primary channel signal as the quantized LSF parameter of the secondary channel signal. This causes relatively severe distortion of the quantized LSF parameter of the secondary channel signal. Consequently, a proportion of frames with a relatively large distortion deviation is relatively high, and quality of a stereo signal obtained through decoding is reduced.

SUMMARY

This disclosure provides a stereo signal encoding method and apparatus, and a stereo signal decoding method and apparatus, to help reduce distortion of a quantized LSF parameter of a secondary channel signal when an LSF parameter of a primary channel signal and an LSF parameter of the secondary channel signal meet a reusing condition, in order to reduce a proportion of frames with a relatively large distortion deviation and improve quality of a stereo signal obtained through decoding.

According to a first aspect, a stereo signal encoding method is provided. The encoding method includes determining a target adaptive broadening factor based on a quantized LSF parameter of a primary channel signal in a current frame and an LSF parameter of a secondary channel signal in the current frame, and writing the quantized LSF parameter of the primary channel signal in the current frame and the target adaptive broadening factor into a bitstream.

In this method, the target adaptive broadening factor is first determined based on the quantized LSF parameter of the primary channel signal and the LSF parameter of the secondary channel signal, and the quantized LSF parameter of the primary channel signal and the target adaptive broadening factor are written into the bitstream and then transmitted to a decoder side, such that the decoder side can determine a quantized LSF parameter of the secondary channel signal based on the target adaptive broadening factor. Compared with a method of directly using the quantized LSF parameter of the primary channel signal as the quantized LSF parameter of the secondary channel signal, this method helps reduce distortion of the quantized LSF parameter of the secondary channel signal, in order to reduce a proportion of frames with a relatively large distortion deviation.

With reference to the first aspect, in a first possible implementation, the determining a target adaptive broadening factor based on a quantized LSF parameter of a primary channel signal in a current frame and an LSF parameter of a secondary channel signal in the current frame includes calculating an adaptive broadening factor based on the quantized LSF parameter of the primary channel signal and the LSF parameter of the secondary channel signal, where the quantized LSF parameter of the primary channel signal, the LSF parameter of the secondary channel signal, and the adaptive broadening factor β satisfy the following relationship:

$$\beta = \frac{\sum_{i=1}^{M} w_i\left[-\overline{LSF}_S^2(i) + LSF_S(i)\overline{LSF}_S(i) - LSF_S(i)LSF_P(i) + \overline{LSF}_S(i)LSF_P(i)\right]}{\sum_{i=1}^{M} w_i\left[-\overline{LSF}_S^2(i) - LSF_P^2(i) + 2\overline{LSF}_S(i)LSF_P(i)\right]},$$

where $LSF_S$ is a vector of the LSF parameter of the secondary channel signal, $LSF_P$ is a vector of the quantized LSF parameter of the primary channel signal, $\overline{LSF}_S$ is a mean vector of the LSF parameter of the secondary channel signal, i is a vector index, $1 \le i \le M$, i is an integer, M is a linear prediction order, and w is a weighting coefficient, and quantizing the adaptive broadening factor to obtain the target adaptive broadening factor.

In this implementation, the determined adaptive broadening factor is an adaptive broadening factor β that minimizes a weighted distance between a spectrum-broadened LSF parameter of the primary channel signal and the LSF parameter of the secondary channel signal. Therefore, determining a quantized LSF parameter of the secondary channel signal based on the target adaptive broadening factor obtained by quantizing the adaptive broadening factor β helps further reduce distortion of the quantized LSF parameter of the secondary channel signal, in order to further help reduce a proportion of frames with a relatively large distortion deviation.

With reference to any one of the first aspect or the foregoing possible implementation, in a second possible implementation, the encoding method further includes determining a quantized LSF parameter of the secondary channel signal based on the target adaptive broadening factor and the quantized LSF parameter of the primary channel signal.

With reference to the second possible implementation, in a third possible implementation, the determining a quantized LSF parameter of the secondary channel signal based on the target adaptive broadening factor and the quantized LSF parameter of the primary channel signal includes performing pull-to-average processing on the quantized LSF parameter of the primary channel signal based on the target adaptive broadening factor to obtain a broadened LSF parameter of the primary channel signal, where the pull-to-average processing is performed according to the following formula:

$$LSF_{SB}(i)=\beta^q\cdot LSF_P(i)+(1-\beta^q)\cdot\overline{LSF_S}(i),$$

where $LSF_{SB}$ represents the broadened LSF parameter of the primary channel signal, $LSF_P(i)$ represents a vector of the quantized LSF parameter of the primary channel signal, i represents a vector index, $\beta^q$ represents the target adaptive broadening factor, $\overline{LSF_S}$ represents a mean vector of the LSF parameter of the secondary channel signal, 1≤i≤M, i is an integer, and M represents a linear prediction parameter, and determining the quantized LSF parameter of the secondary channel signal based on the broadened LSF parameter of the primary channel signal.

In this implementation, the quantized LSF parameter of the secondary channel signal may be obtained by performing pull-to-average processing on the quantized LSF parameter of the primary channel signal. This helps further reduce distortion of the quantized LSF parameter of the secondary channel signal.

With reference to the first aspect, in a fourth possible implementation, a weighted distance between a quantized LSF parameter obtained by performing spectrum broadening on the quantized LSF parameter of the primary channel signal based on the target adaptive broadening factor and the LSF parameter of the secondary channel signal is the shortest.

In this implementation, the target adaptive broadening factor is an adaptive broadening factor β that minimizes the weighted distance between the spectrum-broadened LSF parameter of the primary channel signal and the LSF parameter of the secondary channel signal. Therefore, determining the quantized LSF parameter of the secondary channel signal based on the target adaptive broadening factor β helps further reduce distortion of the quantized LSF parameter of the secondary channel signal, in order to further help reduce a proportion of frames with a relatively large distortion deviation.

With reference to the first aspect, in a fifth possible implementation, a weighted distance between an LSF parameter obtained by performing spectrum broadening on the quantized LSF parameter of the primary channel signal based on the target adaptive broadening factor and the LSF parameter of the secondary channel signal is the shortest.

The LSF parameter obtained by performing spectrum broadening on the quantized LSF parameter of the primary channel signal based on the target adaptive broadening factor is obtained according to the following steps converting the quantized LSF parameter of the primary channel signal based on the target adaptive broadening factor, to obtain an LPC, modifying the LPC to obtain a modified LPC, and converting the modified LPC to obtain the LSF parameter obtained by performing spectrum broadening on the quantized LSF parameter of the primary channel signal based on the target adaptive broadening factor.

In this implementation, the target adaptive broadening factor is a target adaptive broadening factor β that minimizes the weighted distance between the spectrum-broadened LSF parameter of the primary channel signal and the LSF parameter of the secondary channel signal. Therefore, determining the quantized LSF parameter of the secondary channel signal based on the target adaptive broadening factor β helps further reduce distortion of the quantized LSF parameter of the secondary channel signal, in order to further help reduce a proportion of frames with a relatively large distortion deviation.

Because the quantized LSF parameter of the secondary channel signal is an LSF parameter obtained by performing spectrum broadening on the quantized LSF parameter of the primary channel signal based on the target adaptive broadening factor, complexity can be reduced.

To be more specific, single-stage prediction is performed on the quantized LSF parameter of the primary channel signal based on the target adaptive broadening factor, and a result of the single-stage prediction is used as the quantized LSF parameter of the secondary channel signal.

With reference to any one of the first aspect or the foregoing possible implementations, in a sixth possible implementation, before the determining a target adaptive broadening factor based on a quantized LSF parameter of a primary channel signal in a current frame and an LSF parameter of a secondary channel signal in the current frame, the encoding method further includes determining that the LSF parameter of the secondary channel signal meets a reusing condition.

Whether the LSF parameter of the secondary channel signal meets the reusing condition may be determined according to other approaches, for example, in the determining manner described in the background.

According to a second aspect, a stereo signal decoding method is provided. The decoding method includes obtaining a quantized LSF parameter of a primary channel signal in a current frame through decoding, obtaining a target adaptive broadening factor of a stereo signal in the current frame through decoding, and broadening the quantized LSF parameter of the primary channel signal based on the target adaptive broadening factor to obtain a broadened LSF parameter of the primary channel signal, where the broadened LSF parameter of the primary channel signal is a quantized LSF parameter of a secondary channel signal in the current frame, or the broadened LSF parameter of the primary channel signal is used to determine a quantized LSF parameter of a secondary channel signal in the current frame.

In this method, the quantized LSF parameter of the secondary channel signal is determined based on the target adaptive broadening factor. Compared with that in a method of directly using the quantized LSF parameter of the primary channel signal as the quantized LSF parameter of the secondary channel signal, a similarity between a linear prediction spectral envelope of the primary channel signal and a linear prediction spectral envelope of the secondary channel signal is used. This helps reduce distortion of the quantized LSF parameter of the secondary channel signal, in order to help reduce a proportion of frames with a relatively large distortion deviation.

With reference to the second aspect, in a first possible implementation, the performing spectrum broadening on the quantized LSF parameter of the primary channel signal in the current frame based on the target adaptive broadening factor to obtain a broadened LSF parameter of the primary channel signal includes performing pull-to-average processing on the quantized LSF parameter of the primary channel signal based on the target adaptive broadening factor to obtain the broadened quantized LSF parameter of the primary channel signal, where the pull-to-average processing is performed according to the following formula:

$$LSF_{SB}(i)=\beta^{q}\cdot LSF_{P}(i)+(1-\beta^{q})\cdot\overline{LSF_{S}}(i).$$

Herein, $LSF_{SB}$ represents the broadened LSF parameter of the primary channel signal, $LSF_{P}(i)$ represents a vector of the quantized LSF parameter of the primary channel signal, i represents a vector index, $\beta_q$ represents the target adaptive broadening factor, $\overline{LSF_S}$ represents a mean vector of an LSF parameter of the secondary channel signal, $1\leq i\leq M$, i is an integer, and M represents a linear prediction parameter.

In this implementation, the quantized LSF parameter of the secondary channel signal may be obtained by performing pull-to-average processing on the quantized LSF parameter of the primary channel signal. This helps further reduce distortion of the quantized LSF parameter of the secondary channel signal.

With reference to the second aspect, in a second possible implementation, the performing spectrum broadening on the quantized LSF parameter of the primary channel signal in the current frame based on the target adaptive broadening factor to obtain a broadened LSF parameter of the primary channel signal includes converting the quantized LSF parameter of the primary channel signal, to obtain an LPC, modifying the LPC based on the target adaptive broadening factor, to obtain a modified LPC, and converting the modified LPC to obtain a converted LSF parameter, and using the converted LSF parameter as the broadened LSF parameter of the primary channel signal.

In this implementation, the quantized LSF parameter of the secondary channel signal may be obtained by performing linear prediction on the quantized LSF parameter of the primary channel signal. This helps further reduce distortion of the quantized LSF parameter of the secondary channel signal.

With reference to any one of the second aspect or the foregoing possible implementations, in a third possible implementation, the quantized LSF parameter of the secondary channel signal is the broadened LSF parameter of the primary channel signal.

In this implementation, complexity can be reduced.

According to a third aspect, a stereo signal encoding apparatus is provided. The encoding apparatus includes modules configured to perform the encoding method according to any one of the first aspect or the possible implementations of the first aspect.

According to a fourth aspect, a stereo signal decoding apparatus is provided. The decoding apparatus includes modules configured to perform the decoding method according to any one of the second aspect or the possible implementations of the second aspect.

According to a fifth aspect, a stereo signal encoding apparatus is provided. The encoding apparatus includes a memory and a processor. The memory is configured to store a program. The processor is configured to execute the program. When executing the program in the memory, the processor implements the encoding method according to any one of the first aspect or the possible implementations of the first aspect.

According to a sixth aspect, a stereo signal decoding apparatus is provided. The decoding apparatus includes a memory and a processor. The memory is configured to store a program. The processor is configured to execute the program. When executing the program in the memory, the processor implements the decoding method according to any one of the second aspect or the possible implementations of the second aspect.

According to a seventh aspect, a computer-readable storage medium is provided. The computer-readable storage medium stores program code to be executed by an apparatus or a device, and the program code includes an instruction used to implement the encoding method according to any one of the first aspect or the possible implementations of the first aspect.

According to an eighth aspect, a computer-readable storage medium is provided. The computer-readable storage medium stores program code to be executed by an apparatus or a device, and the program code includes an instruction used to implement the decoding method according to any one of the second aspect or the possible implementations of the second aspect.

According to a ninth aspect, a chip is provided. The chip includes a processor and a communications interface. The communications interface is configured to communicate with an external device. The processor is configured to implement the encoding method according to any one of the first aspect or the possible implementations of the first aspect.

Optionally, the chip may further include a memory. The memory stores an instruction. The processor is configured to execute the instruction stored in the memory. When the instruction is executed, the processor is configured to implement the encoding method according to any one of the first aspect or the possible implementations of the first aspect.

Optionally, the chip may be integrated into a terminal device or a network device.

According to a tenth aspect, a chip is provided. The chip includes a processor and a communications interface. The communications interface is configured to communicate with an external device. The processor is configured to implement the decoding method according to any one of the second aspect or the possible implementations of the second aspect.

Optionally, the chip may further include a memory. The memory stores an instruction. The processor is configured to execute the instruction stored in the memory. When the instruction is executed, the processor is configured to implement the decoding method according to any one of the second aspect or the possible implementations of the second aspect.

Optionally, the chip may be integrated into a terminal device or a network device.

According to an eleventh aspect, an embodiment of this disclosure provides a computer program product including an instruction. When the computer program product is run on a computer, the computer is enabled to perform the encoding method according to the first aspect.

According to a twelfth aspect, an embodiment of this disclosure provides a computer program product including an instruction. When the computer program product is run on a computer, the computer is enabled to perform the decoding method according to the second aspect.

DESCRIPTION OF EMBODIMENTS

The following describes technical solutions in this disclosure with reference to accompanying drawings.

Figure 1:
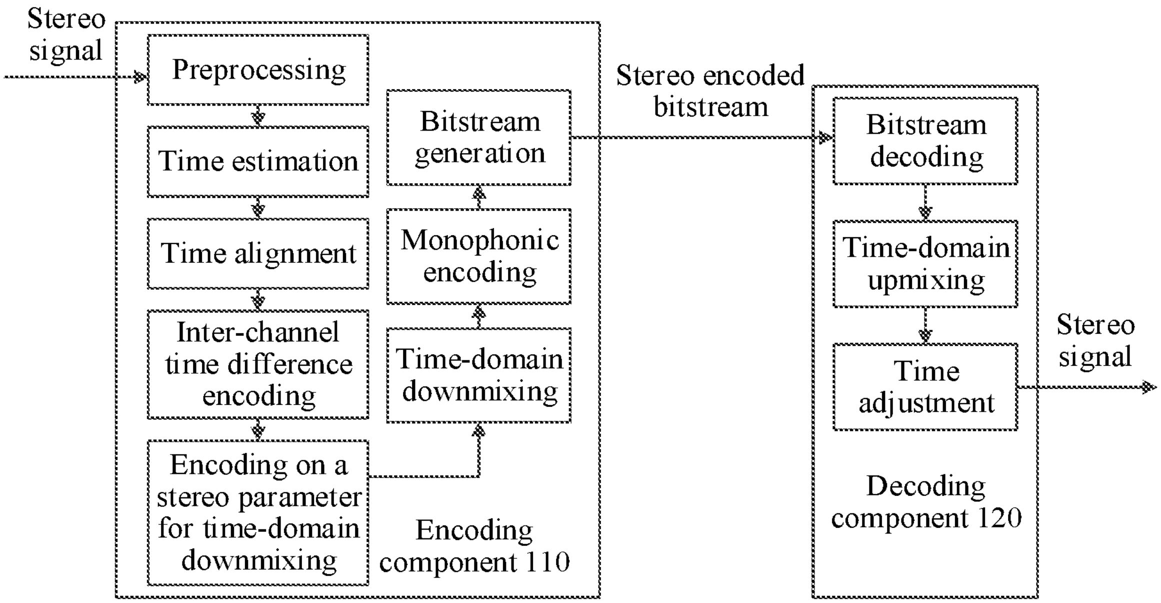
FIG. 1 is a schematic structural diagram of a stereo encoding and decoding system in time domain according to an embodiment of this disclosure.

FIG. 1 is a schematic structural diagram of a stereo encoding and decoding system in time domain according to an example embodiment of this disclosure. The stereo encoding and decoding system includes an encoding component 110 and a decoding component 120.

It should be understood that a stereo signal in this disclosure may be an original stereo signal, may be a stereo signal including two signals included in signals on a plurality of channels, or may be a stereo signal including two signals jointly generated from a plurality of signals included in signals on a plurality of channels.

The encoding component 110 is configured to encode the stereo signal in time domain. Optionally, the encoding component 110 may be implemented in a form of software, hardware, or a combination of software and hardware. This is not limited in the embodiments of this disclosure.

That the encoding component 110 encodes the stereo signal in time domain may include the following steps.

(1) Perform time-domain preprocessing on the obtained stereo signal to obtain a time-domain preprocessed left-channel signal and a time-domain preprocessed right-channel signal.

The stereo signal may be collected by a collection component and sent to the encoding component 110. Optionally, the collection component and the encoding component 110 may be disposed in a same device. Alternatively, the collection component and the encoding component 110 may be disposed in different devices.

The time-domain preprocessed left-channel signal and the time-domain preprocessed right-channel signal are signals on two channels in a preprocessed stereo signal.

Optionally, the time-domain preprocessing may include at least one of high-pass filtering processing, pre-emphasis processing, sample rate conversion, and channel switching. This is not limited in the embodiments of this disclosure.

(2) Perform time estimation based on the time-domain preprocessed left-channel signal and the time-domain preprocessed right-channel signal, to obtain an inter-channel time difference between the time-domain preprocessed left-channel signal and the time-domain preprocessed right-channel signal.

For example, a cross-correlation function between a left-channel signal and a right-channel signal may be calculated based on the time-domain preprocessed left-channel signal and the time-domain preprocessed right-channel signal. Then, a maximum value of the cross-correlation function is searched for, and the maximum value is used as the inter-channel time difference between the time-domain preprocessed left-channel signal and the time-domain preprocessed right-channel signal.

For another example, a cross-correlation function between a left-channel signal and a right-channel signal may be calculated based on the time-domain preprocessed left-channel signal and the time-domain preprocessed right-channel signal. Then, long-time smoothing is performed on a cross-correlation function between a left-channel signal and a right-channel signal in a current frame based on a cross-correlation function between a left-channel signal and a right-channel signal in each of previous L frames (L is an integer greater than or equal to 1) of the current frame, to obtain a smoothed cross-correlation function. Subsequently, a maximum value of the smoothed cross-correlation function is searched for, and an index value corresponding to the maximum value is used as an inter-channel time difference between a time-domain preprocessed left-channel signal and a time-domain preprocessed right-channel signal in the current frame.

For another example, inter-frame smoothing may be performed on an estimated inter-channel time difference in a current frame based on inter-channel time differences in previous M frames (M is an integer greater than or equal to 1) of the current frame, and a smoothed inter-channel time difference is used as a final inter-channel time difference between a time-domain preprocessed left-channel signal and a time-domain preprocessed right-channel signal in the current frame.

It should be understood that the foregoing inter-channel time difference estimation method is merely an example, and the embodiments of this disclosure are not limited to the foregoing inter-channel time difference estimation method.

(3) Perform time alignment on the time-domain preprocessed left-channel signal and the time-domain preprocessed right-channel signal based on the inter-channel time difference, to obtain a time-aligned left-channel signal and a time-aligned right-channel signal.

For example, one or two signals in the left-channel signal and the right-channel signal in the current frame may be compressed or pulled based on the estimated inter-channel time difference in the current frame and an inter-channel time difference in a previous frame, such that no inter-channel time difference exists between the time-aligned left-channel signal and the time-aligned right-channel signal.

(4) Encode the inter-channel time difference to obtain an encoding index of the inter-channel time difference.

(5) Calculate a stereo parameter for time-domain downmixing, and encode the stereo parameter for time-domain downmixing to obtain an encoding index of the stereo parameter for time-domain downmixing.

The stereo parameter for time-domain downmixing is used to perform time-domain downmixing on the time-aligned left-channel signal and the time-aligned right-channel signal.

(6) Perform time-domain downmixing on the time-aligned left-channel signal and the time-aligned right-channel signal based on the stereo parameter for time-domain downmixing, to obtain a primary channel signal and a secondary channel signal.

The primary channel signal is used to represent related information between channels, and may also be referred to as a downmixed signal or a center channel signal. The secondary channel signal is used to represent difference information between channels, and may also be referred to as a residual signal or a side channel signal.

When the time-aligned left-channel signal and the time-aligned right-channel signal are aligned in time domain, the secondary channel signal is the weakest. In this case, the stereo signal has the best effect.

(7) Separately encode the primary channel signal and the secondary channel signal to obtain a first monophonic encoded bitstream corresponding to the primary channel signal and a second monophonic encoded bitstream corresponding to the secondary channel signal.

(8) Write the encoding index of the inter-channel time difference, the encoding index of the stereo parameter, the first monophonic encoded bitstream, and the second monophonic encoded bitstream into a stereo encoded bitstream.

The decoding component 120 is configured to decode the stereo encoded bitstream generated by the encoding component 110, to obtain the stereo signal.

Optionally, the encoding component 110 may be connected to the decoding component 120 in a wired or wireless manner, and the decoding component 120 may obtain, through a connection between the decoding component 120 and the encoding component 110, the stereo encoded bitstream generated by the encoding component 110. Alternatively, the encoding component 110 may store the generated stereo encoded bitstream in a memory, and the decoding component 120 reads the stereo encoded bitstream in the memory.

Optionally, the decoding component 120 may be implemented in a form of software, hardware, or a combination of software and hardware. This is not limited in the embodiments of this disclosure.

A process in which the decoding component 120 decodes the stereo encoded bitstream to obtain the stereo signal may include the following steps.

(1) Decode the first monophonic encoded bitstream and the second monophonic encoded bitstream in the stereo encoded bitstream to obtain the primary channel signal and the secondary channel signal.

(2) Obtain an encoding index of a stereo parameter for time-domain upmixing based on the stereo encoded bitstream, and perform time-domain upmixing on the primary channel signal and the secondary channel signal to obtain a time-domain upmixed left-channel signal and a time-domain upmixed right-channel signal.

(3) Obtain the encoding index of the inter-channel time difference based on the stereo encoded bitstream, and perform time adjustment on the time-domain upmixed left-channel signal and the time-domain upmixed right-channel signal, to obtain the stereo signal.

Optionally, the encoding component 110 and the decoding component 120 may be disposed in a same device, or may be disposed in different devices. The device may be a mobile terminal that has an audio signal processing function, such as a mobile phone, a tablet computer, a laptop portable computer, a desktop computer, a BLUETOOTH sound box, a recording pen, or a wearable device, or may be a network element that has an audio signal processing capability in a core network or a wireless network. This is not limited in the embodiments of this disclosure.

Figure 2:
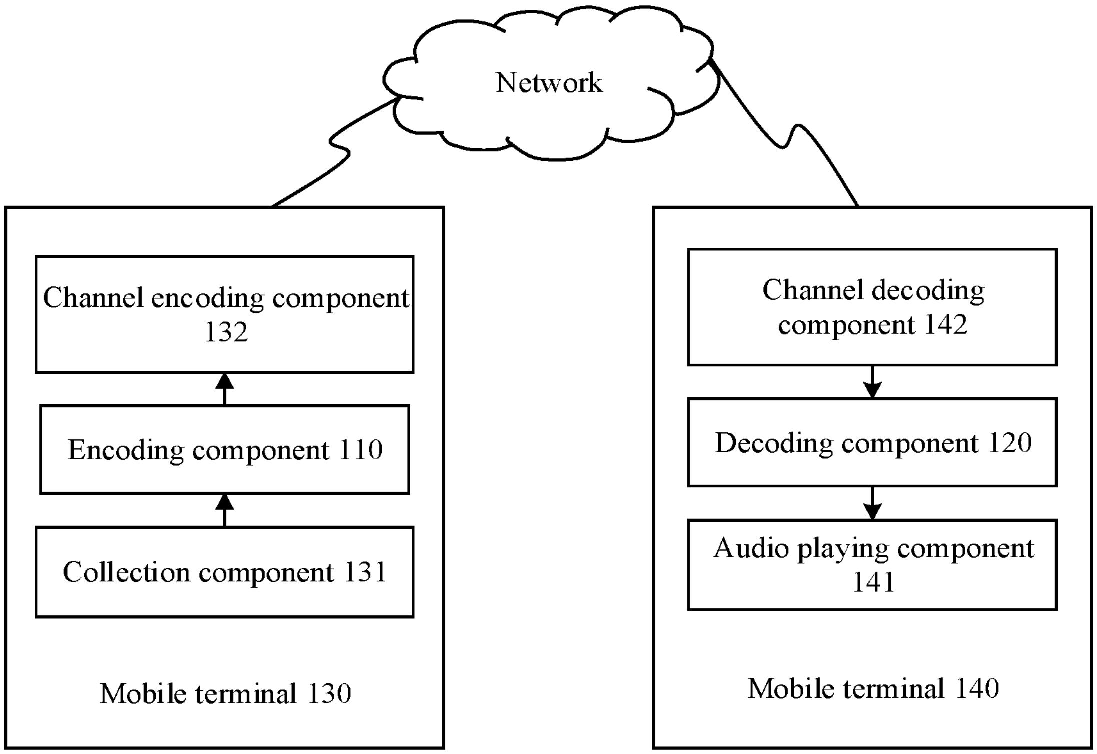
FIG. 2 is a schematic diagram of a mobile terminal according to an embodiment of this disclosure.

For example, as shown in FIG. 2, descriptions are provided by using the following example. The encoding component 110 is disposed in a mobile terminal 130. The decoding component 120 is disposed in a mobile terminal 140. The mobile terminal 130 and the mobile terminal 140 are electronic devices that are independent of each other and that have an audio signal processing capability. For example, the mobile terminal 130 and the mobile terminal 140 each may be a mobile phone, a wearable device, a virtual reality (VR) device, an augmented reality (AR) device, or the like. In addition, the mobile terminal 130 is connected to the mobile terminal 140 through a wireless or wired network.

Optionally, the mobile terminal 130 may include a collection component 131, the encoding component 110, and a channel encoding component 132. The collection component 131 is connected to the encoding component 110, and the encoding component 110 is connected to the encoding component 132.

Optionally, the mobile terminal 140 may include an audio playing component 141, the decoding component 120, and a channel decoding component 142. The audio playing component 141 is connected to the decoding component 120, and the decoding component 120 is connected to the channel decoding component 142.

After collecting a stereo signal by using the collection component 131, the mobile terminal 130 encodes the stereo signal by using the encoding component 110, to obtain a stereo encoded bitstream. Then, the mobile terminal 130 encodes the stereo encoded bitstream by using the channel encoding component 132 to obtain a transmission signal.

The mobile terminal 130 sends the transmission signal to the mobile terminal 140 through the wireless or wired network.

After receiving the transmission signal, the mobile terminal 140 decodes the transmission signal by using the channel decoding component 142 to obtain the stereo encoded bitstream, decodes the stereo encoded bitstream by using the decoding component 120 to obtain the stereo signal, and plays the stereo signal by using the audio playing component 141.

Figure 3:
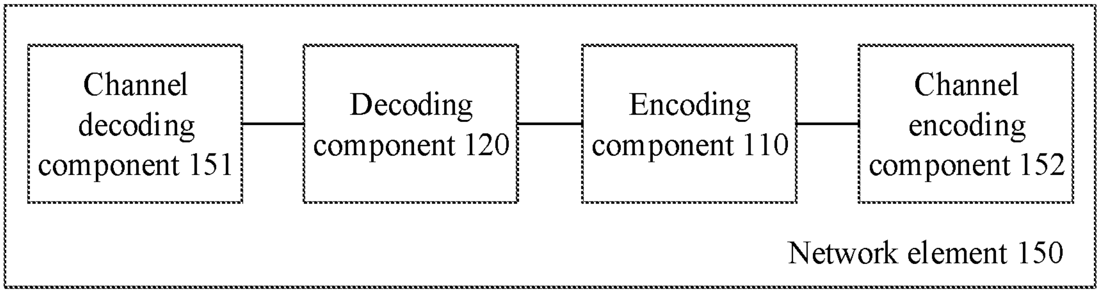
FIG. 3 is a schematic diagram of a network element according to an embodiment of this disclosure.

For example, as shown in FIG. 3, an example in which the encoding component 110 and the decoding component 120 are disposed in a same network element 150 having an audio signal processing capability in a core network or a wireless network is used for description in this embodiment of this disclosure.

Optionally, the network element 150 includes a channel decoding component 151, the decoding component 120, the encoding component 110, and a channel encoding component 152. The channel decoding component 151 is connected to the decoding component 120, the decoding component 120 is connected to the encoding component 110, and the encoding component 110 is connected to the channel encoding component 152.

After receiving a transmission signal sent by another device, the channel decoding component 151 decodes the transmission signal to obtain a first stereo encoded bitstream. The decoding component 120 decodes the stereo encoded bitstream to obtain a stereo signal. The encoding component 110 encodes the stereo signal to obtain a second stereo encoded bitstream. The channel encoding component 152 encodes the second stereo encoded bitstream to obtain the transmission signal.

The other device may be a mobile terminal that has an audio signal processing capability, or may be another network element that has an audio signal processing capability. This is not limited in the embodiments of this disclosure.

Optionally, the encoding component 110 and the decoding component 120 in the network element may transcode a stereo encoded bitstream sent by the mobile terminal.

Optionally, in the embodiments of this disclosure, a device on which the encoding component 110 is installed may be referred to as an audio encoding device. During actual implementation, the audio encoding device may also have an audio decoding function. This is not limited in the embodiments of this disclosure.

Optionally, in the embodiments of this disclosure, only the stereo signal is used as an example for description. In this disclosure, the audio encoding device may further process a multi-channel signal, and the multi-channel signal includes at least two channel signals.

The encoding component 110 may encode the primary channel signal and the secondary channel signal by using an algebraic code excited linear prediction (ACELP) encoding method.

The ACELP encoding method usually includes determining an LPC of the primary channel signal and an LPC of the secondary channel signal, converting each of the LPC of the primary channel signal and the LPC of the secondary channel signal into an LSF parameter, and performing quantization encoding on the LSF parameter of the primary channel signal and the LSF parameter of the secondary channel signal, searching adaptive code excitation to determine a pitch period and an adaptive codebook gain, and separately performing quantization encoding on the pitch period and the adaptive codebook gain, searching algebraic code excitation to determine a pulse index and a gain of the algebraic code excitation, and separately performing quantization encoding on the pulse index and the gain of the algebraic code excitation.

Figure 4:
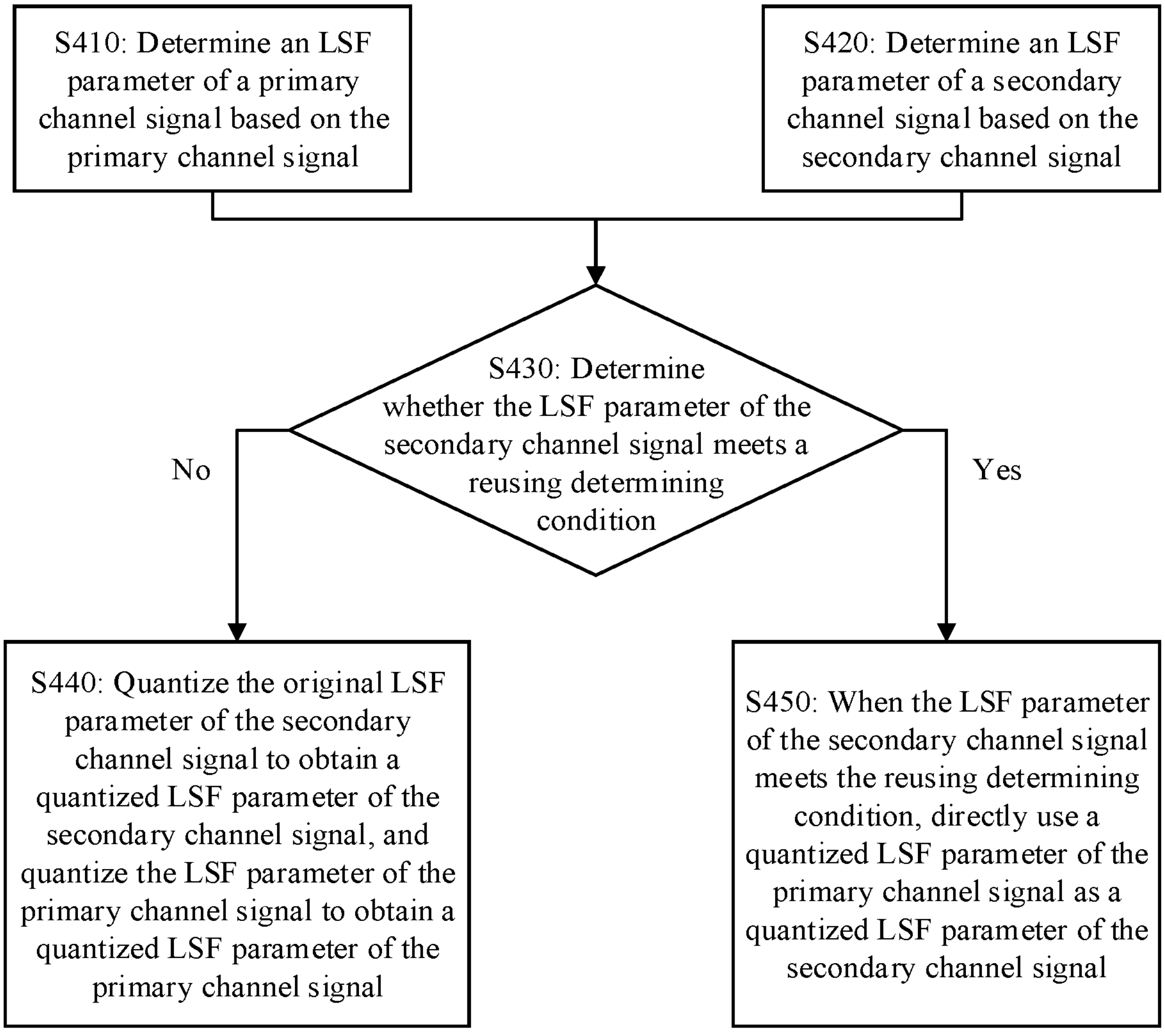
FIG. 4 is a schematic flowchart of a method for performing quantization encoding on an LSF parameter of a primary channel signal and an LSF parameter of a secondary channel signal.

FIG. 4 shows an example method in which the encoding component 110 performs quantization encoding on the LSF parameter of the primary channel signal and the LSF parameter of the secondary channel signal.

S410. Determine the LSF parameter of the primary channel signal based on the primary channel signal.

S420. Determine the LSF parameter of the secondary channel signal based on the secondary channel signal.

There is no execution sequence between step S410 and step S420.

S430. Determine, based on the LSF parameter of the primary channel signal and the LSF parameter of the secondary channel signal, whether the LSF parameter of the secondary channel signal meets a reusing determining condition. The reusing determining condition may also be referred to as a reusing condition for short.

If the LSF parameter of the secondary channel signal does not meet the reusing determining condition, step S440 is performed. If the LSF parameter of the secondary channel signal meets the reusing determining condition, step S450 is performed.

Reusing means that a quantized LSF parameter of the secondary channel signal may be obtained based on a quantized LSF parameter of the primary channel signal. For example, the quantized LSF parameter of the primary channel signal is used as the quantized LSF parameter of the secondary channel signal. In other words, the quantized LSF parameter of the primary channel signal is reused as the quantized LSF parameter of the secondary channel signal.

Determining whether the LSF parameter of the secondary channel signal meets the reusing determining condition may be referred to as performing reusing determining on the LSF parameter of the secondary channel signal.

For example, when the reusing determining condition is that a distance between the original LSF parameter of the primary channel signal and the original LSF parameter of the secondary channel signal is less than or equal to a preset threshold, if the distance between the LSF parameter of the primary channel signal and the LSF parameter of the secondary channel signal is greater than the preset threshold, it is determined that the LSF parameter of the secondary channel signal does not meet the reusing determining condition, or if the distance between the LSF parameter of the primary channel signal and the LSF parameter of the secondary channel signal is less than or equal to the preset threshold, it may be determined that the LSF parameter of the secondary channel signal meets the reusing determining condition.

It should be understood that the determining condition used in the foregoing reusing determining is merely an example, and this is not limited in this disclosure.

The distance between the LSF parameter of the primary channel signal and the LSF parameter of the secondary channel signal may be used to represent a difference between the LSF parameter of the primary channel signal and the LSF parameter of the secondary channel signal.

The distance between the LSF parameter of the primary channel signal and the LSF parameter of the secondary channel signal may be calculated in a plurality of manners.

For example, the distance $WD_n^2$ between the LSF parameter of the primary channel signal and the LSF parameter of the secondary channel signal may be calculated according to the following formula:

$$WD_n^2 = \sum_{i=1}^{M} w_i [LSF_S(i) - LSF_p(i)]^2.$$

Herein, $LSF_P(i)$ is an LSF parameter vector of the primary channel signal, $LSF_S$ is an LSF parameter vector of the secondary channel signal, i is a vector index, i=1, . . . , or M, M is a linear prediction order, and $w_i$ is an $i^{th}$ weighting coefficient.

Where $WD_n^2$ may also be referred to as a weighted distance. The foregoing formula is merely an example method for calculating the distance between the LSF parameter of the primary channel signal and the LSF parameter of the secondary channel signal, and the distance between the LSF parameter of the primary channel signal and the LSF parameter of the secondary channel signal may be alternatively calculated by using another method. For example, subtraction may be performed on the LSF parameter of the primary channel signal and the LSF parameter of the secondary channel signal.

Performing reusing determining on the original LSF parameter of the secondary channel signal may also be referred to as performing quantization determining on the LSF parameter of the secondary channel signal. If a determining result is to quantize the LSF parameter of the secondary channel signal, quantization encoding may be performed on the original LSF parameter of the secondary channel signal, and an index obtained after the quantization encoding is written into a bitstream, to obtain the quantized LSF parameter of the secondary channel signal.

The determining result in this step may be written into the bitstream, to transmit the determining result to a decoder side.

S440. Quantize the LSF parameter of the secondary channel signal to obtain the quantized LSF parameter of the secondary channel signal, and quantize the LSF parameter of the primary channel signal to obtain the quantized LSF parameter of the primary channel signal.

It should be understood that, when the LSF parameter of the secondary channel signal does not meet the reusing determining condition, quantizing the LSF parameter of the secondary channel signal to obtain the quantized LSF parameter of the secondary channel signal is merely an example. Certainly, the quantized LSF parameter of the secondary channel signal may be alternatively obtained by using another method. This is not limited in this embodiment of this disclosure.

S450. Quantize the LSF parameter of the primary channel signal to obtain the quantized LSF parameter of the primary channel signal.

The quantized LSF parameter of the primary channel signal is directly used as the quantized LSF parameter of the secondary channel signal. This can reduce an amount of data that needs to be transmitted from an encoder side to the decoder side, in order to reduce network bandwidth occupation.

Figure 5:
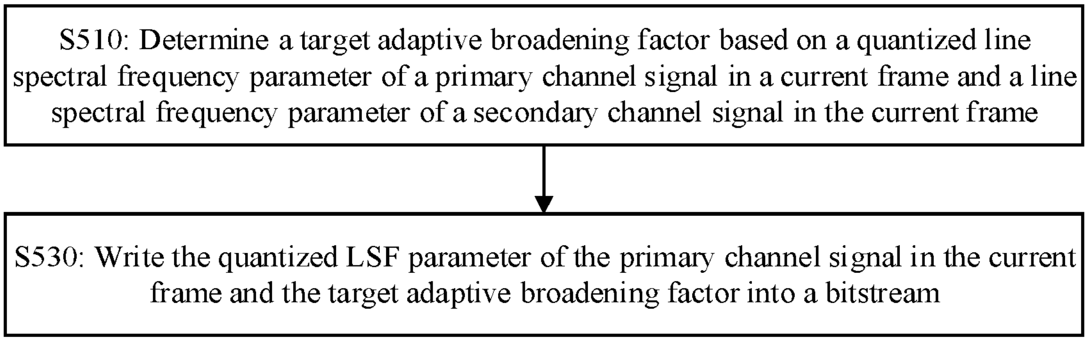
FIG. 5 is a schematic flowchart of a stereo signal encoding method according to an embodiment of this disclosure.

FIG. 5 is a schematic flowchart of a stereo signal encoding method according to an embodiment of this disclosure. When learning that a reusing determining result is that a reusing determining condition is met, the encoding component 110 may perform the method shown in FIG. 5.

S510. Determine a target adaptive broadening factor based on a quantized LSF parameter of a primary channel signal in a current frame and an LSF parameter of a secondary channel signal in the current frame.

The quantized LSF parameter of the primary channel signal in the current frame and the LSF parameter of the secondary channel signal in the current frame may be obtained according to methods in other approaches, and details are not described herein.

S530. Write the quantized LSF parameter of the primary channel signal in the current frame and the target adaptive broadening factor into a bitstream.

Figure 15:
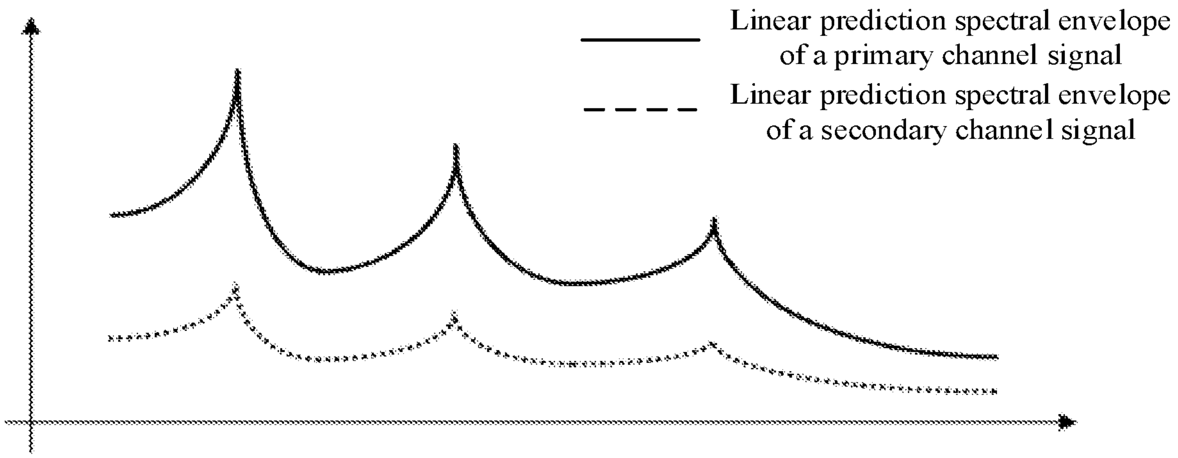
FIG. 15 is a schematic diagram of linear prediction spectral envelopes of a primary channel signal and a secondary channel signal.

In this method, the target adaptive broadening factor is determined based on the quantized LSF parameter of the primary channel signal in the current frame, that is, a similarity between a linear prediction spectral envelope of the primary channel signal and a linear prediction spectral envelope of the secondary channel signal (as shown in FIG. 15) may be used. In this way, the encoding component 110 may not need to write a quantized LSF parameter of the secondary channel signal into the bitstream, but write the target adaptive broadening factor into the bitstream. In other words, the decoding component 120 can obtain the quantized LSF parameter of the secondary channel signal based on the quantized LSF parameter of the primary channel signal and the target adaptive broadening factor. This helps improve encoding efficiency.

Figure 16:
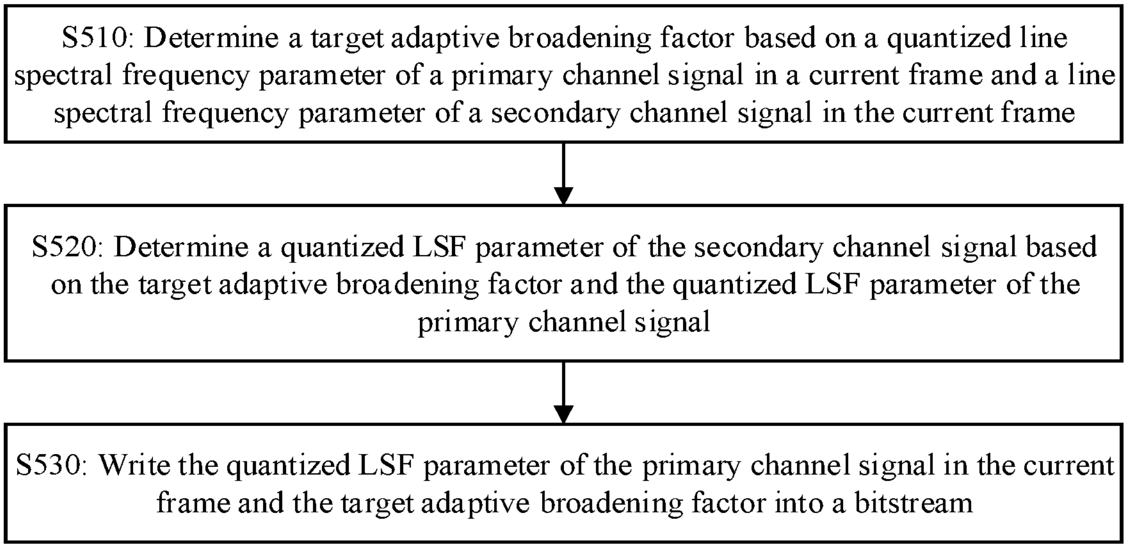
FIG. 16 is a schematic flowchart of a stereo signal encoding method according to another embodiment of this disclosure.

In this embodiment of this disclosure, optionally, as shown in FIG. 16, S520 may be further included to determine the quantized LSF parameter of the secondary channel signal based on the target adaptive broadening factor and the quantized LSF parameter of the primary channel signal.

It should be noted that the quantized LSF parameter that is of the secondary channel signal and that is determined on an encoder side is used for subsequent processing on the encoder side. For example, the quantized LSF parameter of the secondary channel signal may be used for inter prediction, to obtain another parameter or the like.

On the encoder side, the quantized LSF parameter of the secondary channel is determined based on the target adaptive broadening factor and the quantized LSF parameter of the primary channel signal, such that a processing result obtained based on the quantized LSF parameter of the secondary channel in a subsequent operation can be consistent with a processing result on a decoder side.

Figure 6:
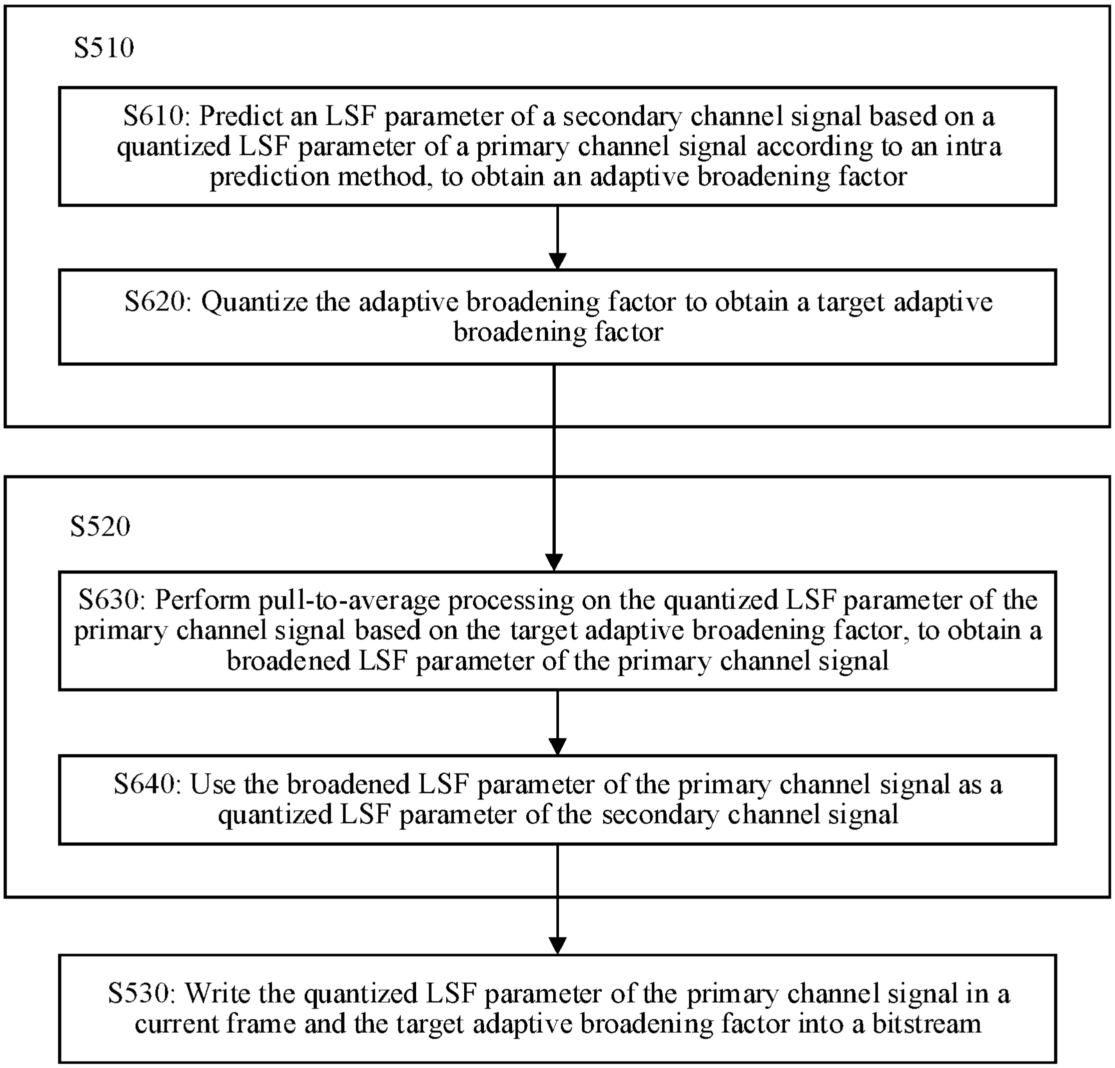
FIG. 6 is a schematic flowchart of a stereo signal encoding method according to another embodiment of this disclosure.

In some possible implementations, as shown in FIG. 6, S510 may include the following steps S610 and S620. S610. Predict the LSF parameter of the secondary channel signal based on the quantized LSF parameter of the primary channel signal according to an intra prediction method, to obtain an adaptive broadening factor. S620. Quantize the adaptive broadening factor to obtain the target adaptive broadening factor.

Correspondingly, S520 may include the following steps S630 and S640. S630. Perform pull-to-average processing on the quantized LSF parameter of the primary channel signal based on the target adaptive broadening factor to obtain a broadened LSF parameter of the primary channel signal. S640. Use the broadened LSF parameter of the primary channel signal as the quantized LSF parameter of the secondary channel signal.

The adaptive broadening factor β used in the process of performing pull-to-average processing on the quantized LSF parameter of the primary channel signal in S610 should enable spectral distortion between an LSF parameter obtained after spectrum broadening is performed on the quantized LSF parameter of the primary channel signal and the LSF parameter of the secondary channel signal to be relatively small.

Further, the adaptive broadening factor β used in the process of performing pull-to-average processing on the quantized LSF parameter of the primary channel signal may minimize the spectral distortion between the LSF parameter obtained after spectrum broadening is performed on the quantized LSF parameter of the primary channel signal and the LSF parameter of the secondary channel signal.

For ease of subsequent description, the LSF parameter obtained after spectrum broadening is performed on the quantized LSF parameter of the primary channel signal may be referred to as a spectrum-broadened LSF parameter of the primary channel signal.

The spectral distortion between the spectrum-broadened LSF parameter of the primary channel signal and the LSF parameter of the secondary channel signal may be estimated by calculating a weighted distance between the spectrum-broadened LSF parameter of the primary channel signal and the LSF parameter of the secondary channel signal.

The weighted distance between the spectrum-broadened quantized LSF parameter of the primary channel signal and the LSF parameter of the secondary channel satisfies the following formula:

$$WD^2=\sum_{i=1}^{M} w_i[LSF_S(i)-LSF_{SB}(i)]^2.$$

Herein, $LSF_{SB}$ is a spectrum-broadened LSF parameter vector of the primary channel signal, $LSF_S$ is an LSF parameter vector of the secondary channel signal, i is a vector index, i=1, . . . , or M, M is a linear prediction order, and $w_i$ is an $i^{th}$ weighting coefficient.

Usually, different linear prediction orders may be set based on different encoding sampling rates. For example, when an encoding sampling rate is 16 kilohertz (kHz), 20-order linear prediction may be performed, that is, M=20. When an encoding sampling rate is 12.8 kHz, 16-order linear prediction may be performed, that is, M=16. An LSF parameter vector may also be briefly referred to as an LSF parameter.

Weighting coefficient selection has a great influence on accuracy of estimating the spectral distortion between the spectrum-broadened LSF parameter of the primary channel signal and the LSF parameter of the secondary channel signal.

The weighting coefficient $w_i$ may be obtained through calculation based on an energy spectrum of a linear prediction filter corresponding to the LSF parameter of the secondary channel signal. For example, the weighting coefficient may satisfy the following formula:

$$w_i=\|A(LSF_S(i))\|^{-P}.$$

Herein, A(·) represents a linear prediction spectrum of the secondary channel signal, $LSF_S$ is an LSF parameter vector of the secondary channel signal, i is a vector index, i=1, . . . , or M, M is a linear prediction order, $\|\cdot\|^{-P}$ represents calculation for the $-p^{th}$ power of a 2-norm of a vector, and p is a decimal greater than 0 and less than 1. Usually, a value range of p may be [0.1, 0.25]. For example, p=0.18, p=0.25, or the like.

After the foregoing formula is expanded, the weighting coefficient satisfies the following formula:

$$w_i=\left\{\left[1+\sum_{i=1}^{M} b_i\cdot\cos(2\pi\cdot LSF_S(i)/FS)\right]^2+\left[\sum_{i=1}^{M} b_i\cdot\sin(2\pi\cdot LSF_S(i)/FS)\right]^2\right\}^{-p}.$$

Herein, $b_i$ represents an $i^{th}$ LPC of the secondary channel signal, i=1, . . . , or M, M is a linear prediction order, $LSF_S(i)$ is an $i^{th}$ LSF parameter of the secondary channel signal, and $F_S$ is an encoding sampling rate. For example, the encoding sampling rate is 16 kHz, and the linear prediction order M is 20.

Certainly, another weighting coefficient used to estimate the spectral distortion between the spectrum-broadened LSF parameter of the primary channel signal and the LSF parameter of the secondary channel signal may be alternatively used. This is not limited in this embodiment of this disclosure.

It is assumed that the spectrum-broadened LSF parameter satisfies the following formula:

$$LSF_{SB}(i)=\beta\cdot LSF_P(i)+(1-\beta)\cdot\overline{LSF_S}(i).$$

Herein, $LSF_{SB}$ is a spectrum-broadened LSF parameter vector of the primary channel signal, β is the adaptive broadening factor, $LSF_P$ is a quantized LSF parameter vector of the primary channel signal, $\overline{LSF_S}$ is a mean vector of the LSF parameter of the secondary channel signal, i is a vector index, i=1, . . . , or M, and M is a linear prediction order.

In this case, the adaptive broadening factor β that minimizes the weighted distance between the spectrum-broadened LSF parameter of the primary channel signal and the LSF parameter of the secondary channel signal satisfies the following formula:

$$\beta=\frac{\sum_{i=1}^{M} w_i\left[-\overline{LSF}_S^2(i)+LSF_S(i)\overline{LSF}_S(i)-LSF_S(i)LSF_P(i)+\overline{LSF}_S(i)LSF_P(i)\right]}{\sum_{i=1}^{M} w_i\left[-\overline{LSF}_S^2(i)-LSF_P^2(i)+2\overline{LSF}_S(i)LSF_P(i)\right]}.$$

Herein, $LSF_S$ is an LSF parameter vector of the secondary channel signal, $LSF_P$ is a quantized LSF parameter vector of the primary channel signal, $\overline{LSF_S}$ is a mean vector of the LSF parameter of the secondary channel signal, i is a vector index, i=1, . . . , or M, and M is a linear prediction order.

In other words, the adaptive broadening factor may be obtained through calculation according to the formula. After the adaptive broadening factor is obtained through calculation according to the formula, the adaptive broadening factor may be quantized, to obtain the target adaptive broadening factor.

A method for quantizing the adaptive broadening factor in S620 may be linear scalar quantization, or may be nonlinear scalar quantization.

For example, the adaptive broadening factor may be quantized by using a relatively small quantity of bits, for example, 1 bit or 2 bits.

For example, when the adaptive broadening factor is quantized by using 1 bit, a codebook of quantizing the adaptive broadening factor by using 1 bit may be represented by $\{\beta_0, \beta_1\}$. The codebook may be obtained through pre-training. For example, the codebook may include {0.95, 0.70}.

A quantization process is to perform one-by-one searching in the codebook to find a codeword with a shortest distance from the calculated adaptive broadening factor β in the codebook, and use the codeword as the target adaptive broadening factor, which is denoted as $\beta^q$. An index corresponding to the codeword with the shortest distance from the calculated adaptive broadening factor β in the codebook is encoded and written into the bitstream.

In S630, when pull-to-average processing is performed on the quantized LSF parameter of the primary channel signal based on the target adaptive broadening factor to obtain the broadened LSF parameter of the primary channel signal, the pull-to-average processing is performed according to the following formula:

$$LSF_{SB}(i)=\beta^q\cdot LSF_P(i)+(1-\beta^q)\cdot\overline{LSF_S}(i).$$

Herein, $LSF_{SB}$ is a spectrum-broadened LSF parameter vector of the primary channel signal, $\beta^q$ is the target adaptive broadening factor, $LSF_P$ is a quantized LSF parameter vector of the primary channel signal, $\overline{LSF_S}$ is a mean vector of the LSF parameter of the secondary channel, i is a vector index, i=1, . . . , or M, and M is a linear prediction order.

Figure 7:
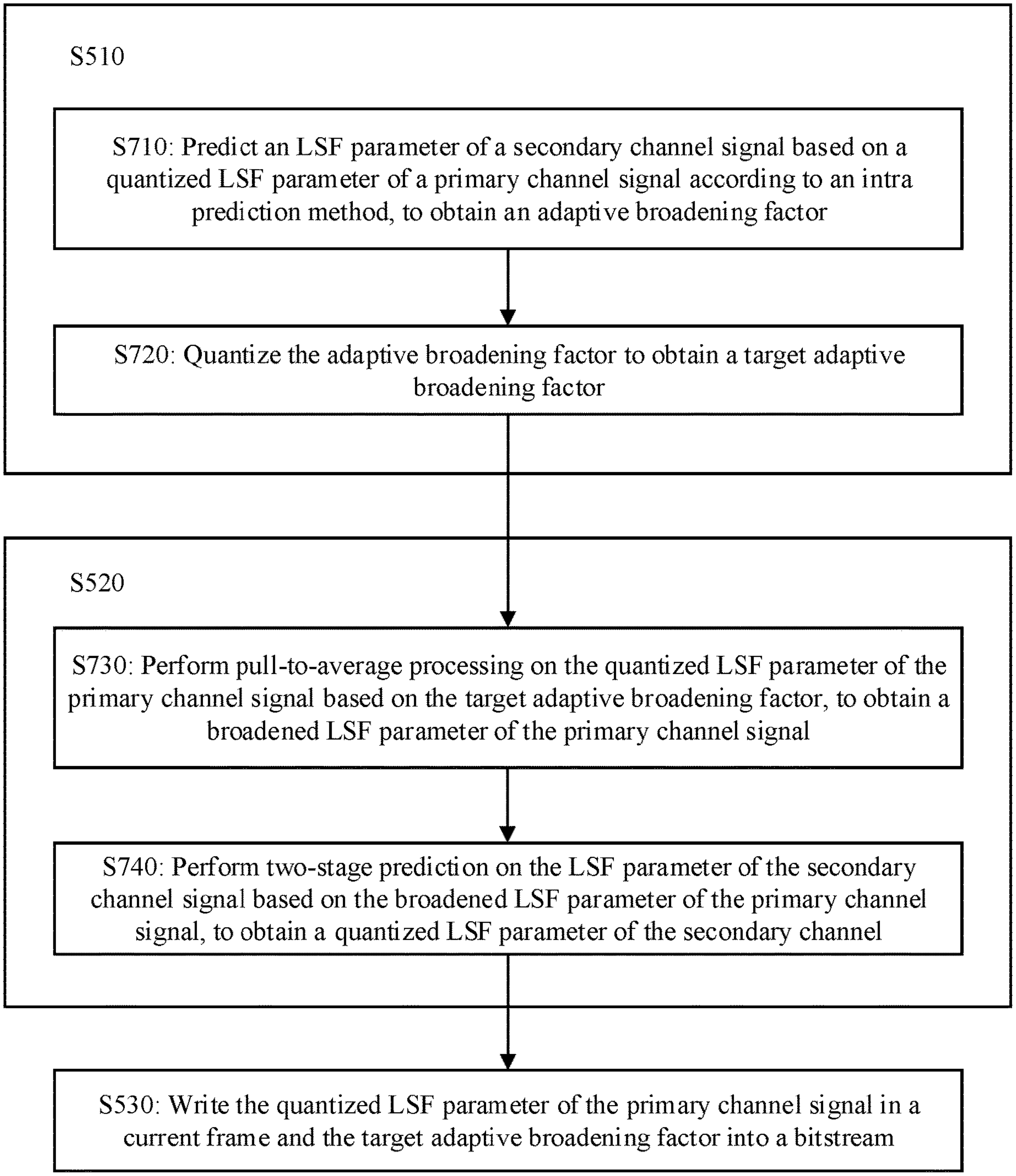
FIG. 7 is a schematic flowchart of a stereo signal encoding method according to another embodiment of this disclosure.

In some possible implementations, as shown in FIG. 7, S510 may include S710 and S720, and S520 may include S730 and S740.

S710. Predict the LSF parameter of the secondary channel signal based on the quantized LSF parameter of the primary channel signal according to an intra prediction method, to obtain an adaptive broadening factor.

S720. Quantize the adaptive broadening factor to obtain the target adaptive broadening factor.

S730. Perform pull-to-average processing on the quantized LSF parameter of the primary channel signal based on the target adaptive broadening factor, to obtain a broadened LSF parameter of the primary channel signal.

For S710 to S730, refer to S610 to S630. Details are not described herein again.

S740. Perform two-stage prediction on the LSF parameter of the secondary channel signal based on the broadened LSF parameter of the primary channel signal, to obtain the quantized LSF parameter of the secondary channel.

Optionally, two-stage prediction may be performed on the LSF parameter of the secondary channel signal based on the broadened LSF parameter of the primary channel signal to obtain a predicted vector of the LSF parameter of the secondary channel signal, and the predicted vector of the LSF parameter of the secondary channel signal is used as the quantized LSF parameter of the secondary channel signal. The predicted vector of the LSF parameter of the secondary channel signal satisfies the following formula:

$$P\_LSF_S(i)=Pre\{LSF_{SB}(i)\}.$$

Herein, $LSF_{SB}$ is a spectrum-broadened LSF parameter vector of the primary channel signal, $P\_LSF_S$ is the predicted vector of the LSF parameter of the secondary channel signal, and $Pre\{LSF_{SB}(i)\}$ represents two-stage prediction performed on the LSF parameter of the secondary channel signal.

Optionally, two-stage prediction may be performed on the LSF parameter of the secondary channel signal according to an inter prediction method based on a quantized LSF parameter of a secondary channel signal in a previous frame and the LSF parameter of the secondary channel signal in the current frame to obtain a two-stage predicted vector of the LSF parameter of the secondary channel signal, a predicted vector of the LSF parameter of the secondary channel signal is obtained based on the two-stage predicted vector of the LSF parameter of the secondary channel signal and the spectrum-broadened LSF parameter of the primary channel signal, and the predicted vector of the LSF parameter of the secondary channel signal is used as the quantized LSF parameter of the secondary channel signal. The predicted vector of the LSF parameter of the secondary channel signal satisfies the following formula:

$$P\_LSF_S(i)=LSF_{SB}(i)+LSF'_S(i).$$

Herein, $P\_LSF_S$ is the predicted vector of the LSF parameter of the secondary channel signal, $LSF_{SB}$ is a spectrum-broadened LSF parameter vector of the primary channel signal, $LSF'_S$ is the two-stage predicted vector of the LSF parameter of the secondary channel signal, i is a vector index, i=1, . . . , or M, and M is a linear prediction order. An LSF parameter vector may also be briefly referred to as an LSF parameter.

Figure 8:
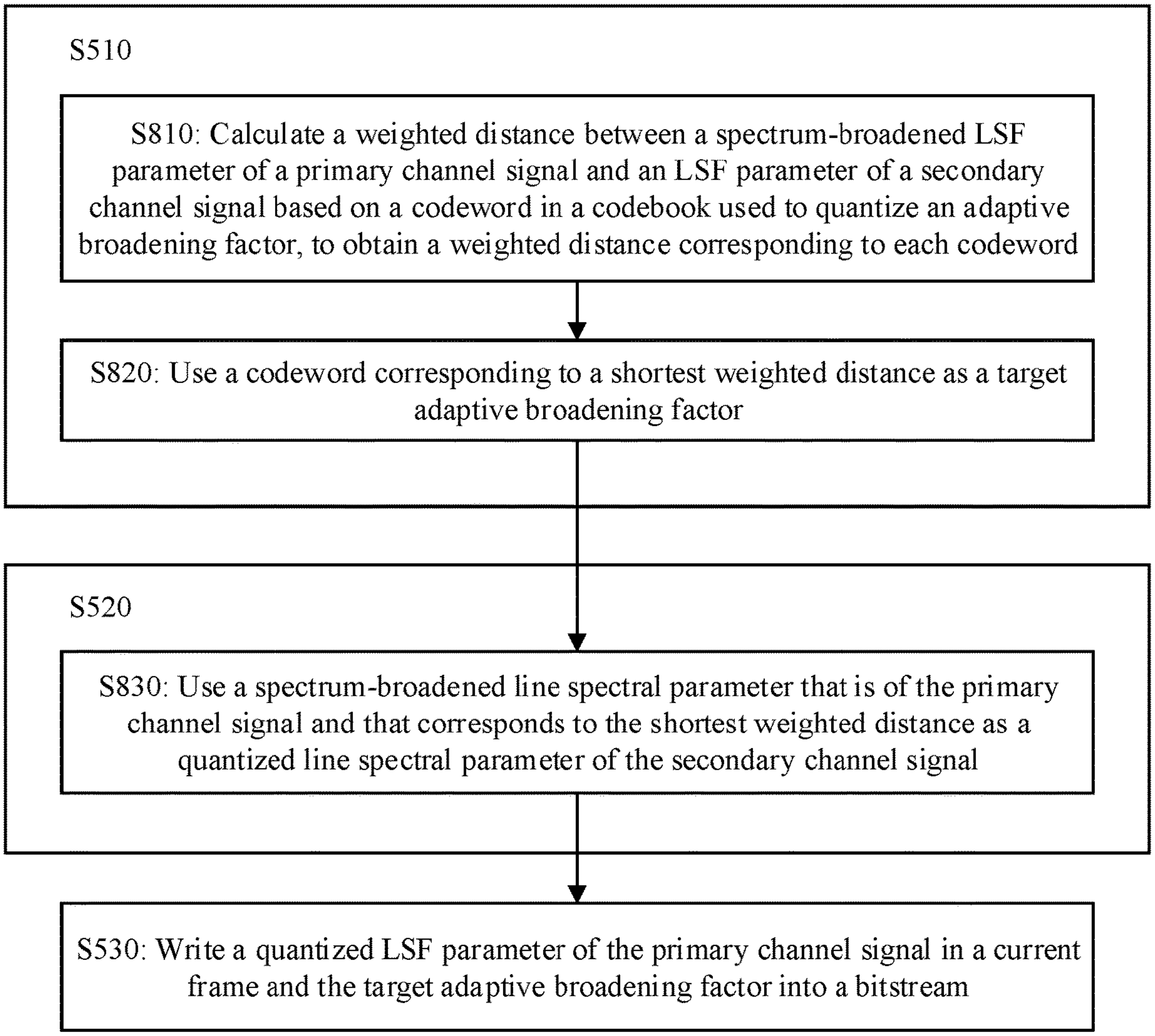
FIG. 8 is a schematic flowchart of a stereo signal encoding method according to another embodiment of this disclosure.

In some possible implementations, as shown in FIG. 8, S510 may include the following steps S810 and S820. S810. Calculate a weighted distance between a spectrum-broadened LSF parameter of the primary channel signal and the LSF parameter of the secondary channel signal based on a codeword in a codebook used to quantize an adaptive broadening factor, to obtain a weighted distance corresponding to each codeword. S820. Use a codeword corresponding to a shortest weighted distance as the target adaptive broadening factor.

Correspondingly, S520 may include S830. S830. Use a spectrum-broadened LSF parameter that is of the primary channel signal and that corresponds to the shortest weighted distance as the quantized LSF parameter of the secondary channel signal.

S830 may also be understood as follows. Use a spectrum-broadened LSF parameter that is of the primary channel signal and that corresponds to the target adaptive broadening factor as the quantized LSF parameter of the secondary channel signal.

It should be understood that using the codeword corresponding to the shortest weighted distance as the target adaptive broadening factor herein is merely an example. For example, a codeword corresponding to a weighted distance that is less than or equal to a preset threshold may be alternatively used as the target adaptive broadening factor.

If N_BITS bits are used to perform quantization encoding on the adaptive broadening factor, the codebook used to quantize the adaptive broadening factor may include $2^{N\_BITS}$ codewords, and the codebook used to quantize the adaptive broadening factor may be represented as $\{\beta_0, \beta_1, \ldots, \beta_{2^{N\_BITS}-1}\}$. A spectrum-broadened LSF parameter $LSF_{SB\_n}$ corresponding to the $n^{th}$ codeword $\beta_n$ in the codebook used to quantize the adaptive broadening factor may be obtained based on the $n^{th}$ codeword, and then a weighted distance $WD_n^2$ between the spectrum-broadened LSF parameter corresponding to the $n^{th}$ codeword and the LSF parameter of the secondary channel signal may be calculated.

A spectrum-broadened LSF parameter vector corresponding to the $n^{th}$ codeword satisfies the following formula:

$$LSF_{SB\_n}(i)=\beta_n\cdot LSF_P(i)+(1-\beta_n)\cdot\overline{LSF_S}(i).$$

Herein, $LSF_{SB\_n}$ is the spectrum-broadened LSF parameter vector corresponding to the $n^{th}$ codeword, $\beta_n$ is the $n^{th}$ codeword in the codebook used to quantize the adaptive broadening factor, $LSF_P$ is a quantized LSF parameter vector of the primary channel signal, $\overline{LSF_S}$ is a mean vector of the LSF parameter of the secondary channel signal, i is a vector index, i=1, . . . , or M, and M is a linear prediction order.

The weighted distance between the spectrum-broadened LSF parameter corresponding to the $n^{th}$ codeword and the LSF parameter of the secondary channel signal satisfies the following formula:

$$WD_n^2=\sum_{i=1}^{M}w_i[LSF_S(i)-LSF_{SB\_n}(i)]^2.$$

Herein $LSF_{SB\_n}$ is the spectrum-broadened LSF parameter vector corresponding to the $n^{th}$ codeword, $LSF_S$ is an LSF parameter vector of the secondary channel signal, i is a vector index, i=1, . . . , or M, M is a linear prediction order, and $w_i$ is an $i^{th}$ weighting coefficient.

Usually, different linear prediction orders may be set based on different encoding sampling rates. For example, when an encoding sampling rate is 16 kHz, 20-order linear prediction may be performed, that is, M=20. When an encoding sampling rate is 12.8 kHz, 16-order linear prediction may be performed, that is, M=16.

A weighting coefficient determining method in this implementation may be the same as the weighting coefficient determining method in the first possible implementation, and details are not described herein again.

Weighted distances between spectrum-broadened LSF parameters corresponding to all codewords in the codebook used to quantize the adaptive broadening factor and the LSF parameter of the secondary channel signal may be represented as $\{WD_0^2, WD_1^2, \ldots, WD_{2^{N\_BITS}-1}^2\}$. $\{WD_0^2, WD_1^2, \ldots, WD_{2^{N\_BITS}-1}^2\}$ is searched for a minimum value. A codeword index beta_index corresponding to the minimum value satisfies the following formula:

$$\text{beta\_index} = \arg \min_{0 \le n \le 2^{N\_BITS}-1} \left(WD_n^2\right).$$

A codeword corresponding to the minimum value is a quantized adaptive broadening factor, that is, $\beta^q=\beta_{beta\_index}$.

The following describes, by using an example in which 1 bit is used to perform quantization encoding on the adaptive broadening factor, a second possible implementation of determining the target adaptive broadening factor based on the quantized LSF parameter of the primary channel signal and the LSF parameter of the secondary channel signal.

A codebook of quantizing the adaptive broadening factor by using 1 bit may be represented by $\{\beta_0, \beta_1\}$. The codebook may be obtained through pre-training, for example, {0.95, 0.70}.

According to the first codeword $\beta_0$ in the codebook used to quantize the adaptive broadening factor, a spectrum-broadened LSF parameter $LSF_{SB\_0}$ corresponding to the first codeword may be obtained, where $$LSF_{SB\_0}(i)=\beta_0 \cdot LSF_P(i)+(1-\beta_0)\cdot \overline{LSF_S}(i).$$

According to the second codeword $\beta_1$ in the codebook used to quantize the adaptive broadening factor, a spectrum-broadened LSF parameter $LSF_{SB\_1}$ corresponding to the second codeword may be obtained, where $$LSF_{SB\_1}(i)=\beta_1 \cdot LSF_P(i)+(1-\beta_1)\cdot \overline{LSF_S}(i).$$

Herein, $LSF_{SB\_0}$ is a spectrum-broadened LSF parameter vector corresponding to the first codeword, $\beta_0$ is the first codeword in the codebook used to quantize the adaptive broadening factor, $LSF_{SB\_1}$ is a spectrum-broadened LSF parameter vector corresponding to the second codeword, $\beta_1$ is the second codeword in the codebook used to quantize the adaptive broadening factor, $LSF_P$ is a quantized LSF parameter vector of the primary channel signal, $\overline{LSF_S}$ is a mean vector of the LSF parameter of the secondary channel signal, i is a vector index, i=1, . . . , or M, and M is a linear prediction order.

Then, a weighted distance $WD_0^2$ between the spectrum-broadened LSF parameter corresponding to the first codeword and the LSF parameter of the secondary channel signal can be calculated, and $WD_0^2$ satisfies the following formula:

$$WD_0^2 = \sum_{i=1}^{M} w_i[LSF_S(i) - LSF_{SB\_0}(i)]^2.$$

A weighted distance $WD_1^2$ between the spectrum-broadened LSF parameter corresponding to the second codeword and the LSF parameter of the secondary channel signal satisfies the following formula:

$$WD_1^2 = \sum_{i=1}^{M} w_i[LSF_S(i) - LSF_{SB\_1}(i)]^2.$$

Herein, $LSF_{SB\_0}$ is the spectrum-broadened LSF parameter vector corresponding to the first codeword, $LSF_{SB\_1}$ is the spectrum-broadened LSF parameter vector corresponding to the second codeword, $LSF_S$ is an LSF parameter vector of the secondary channel signal, i is a vector index, i=1, . . . , or M, M is a linear prediction order, and $w_i$ is an $i^{th}$ weighting coefficient.

Usually, different linear prediction orders may be set based on different encoding sampling rates. For example, when an encoding sampling rate is 16 kHz, 20-order linear prediction may be performed, that is, M=20. When an encoding sampling rate is 12.8 kHz, 16-order linear prediction may be performed, that is, M=16. An LSF parameter vector may also be briefly referred to as an LSF parameter.

Weighted distances between spectrum-broadened LSF parameters corresponding to all codewords in the codebook used to quantize the adaptive broadening factor and the LSF parameter of the secondary channel signal may be represented as $\{WD_0^2, WD_1^2\}$, $\{WD_0^2, WD_1^2\}$ is searched beta for a minimum value. A codeword index beta_index corresponding to the minimum value satisfies the following formula:

$$\text{beta\_index} = \arg \min_{0 \le n \le 1} \left(WD_n^2\right).$$

A codeword corresponding to the minimum value is the target adaptive broadening factor, that is, $\beta_q=\beta_{beta\_index}$.

Figure 9:
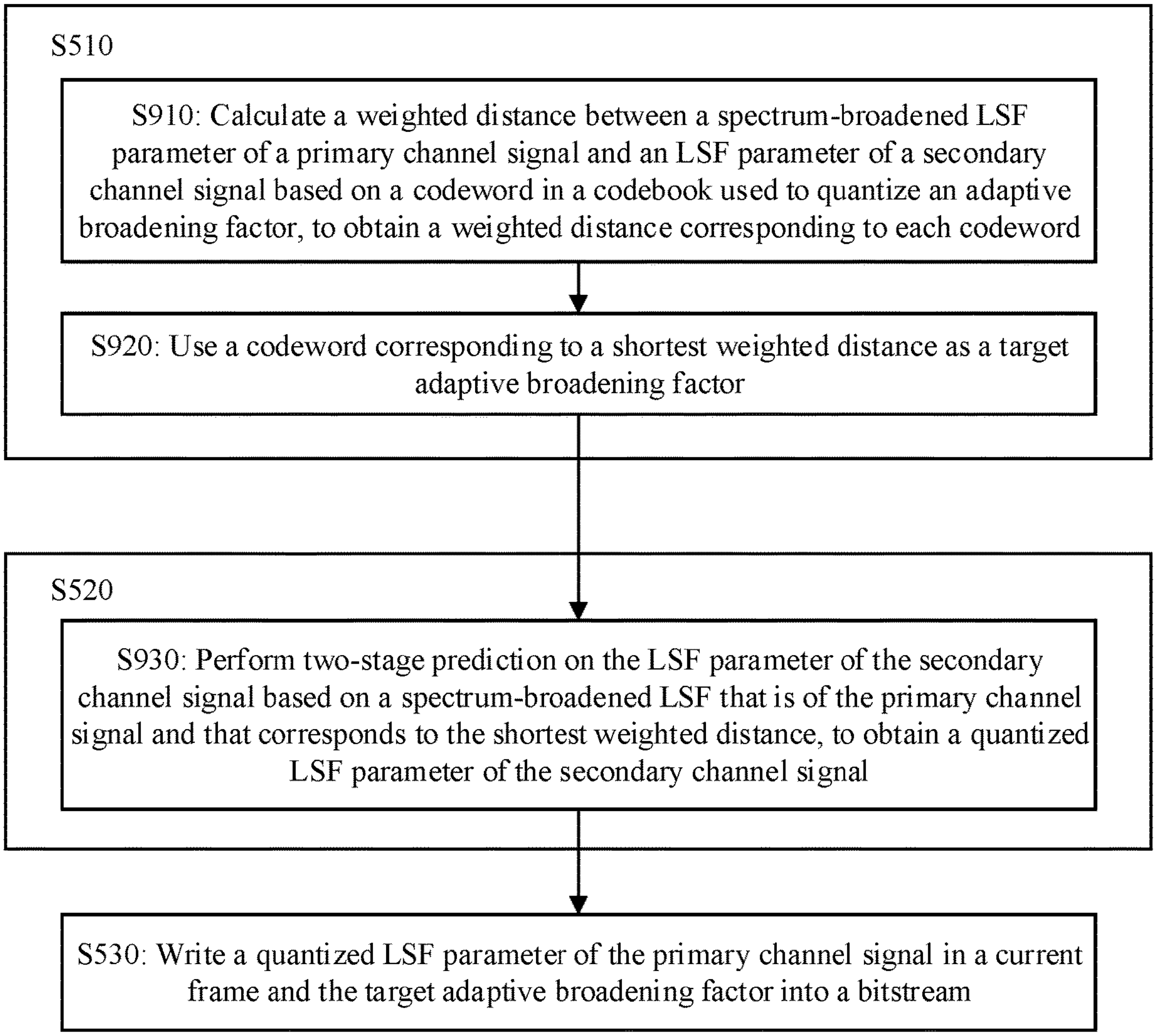
FIG. 9 is a schematic flowchart of a stereo signal encoding method according to another embodiment of this disclosure.

In some possible implementations, as shown in FIG. 9, S510 may include S910 and S920, and S520 may include S930.

S910. Calculate a weighted distance between a spectrum-broadened LSF parameter of the primary channel signal and the LSF parameter of the secondary channel signal based on a codeword in a codebook used to quantize an adaptive broadening factor, to obtain a weighted distance corresponding to each codeword.

S920. Use a codeword corresponding to a shortest weighted distance as the target adaptive broadening factor.

For S910 and S920, refer to S810 and S820. Details are not described herein again.

S930. Perform two-stage prediction on the LSF parameter of the secondary channel signal based on a spectrum-broadened LSF parameter that is of the primary channel signal and that corresponds to the shortest weighted distance, to obtain the quantized LSF parameter of the secondary channel signal.

For this step, refer to S740. Details are not described herein again.

In some possible implementations, S510 may include determining, as the target adaptive broadening factor, a second codeword in the codebook used to quantize the adaptive broadening factor, where the quantized LSF parameter of the primary channel signal is converted based on the second codeword to obtain an LPC, the LPC is modified to obtain a spectrum-broadened LPC, the spectrum-broadened LPC is converted to obtain a spectrum-broadened LSF parameter, and a weighted distance between the spectrum-broadened LSF parameter and the LSF parameter of the secondary channel signal is the shortest. S520 may include using, as the quantized LSF parameter of the secondary channel signal, an LSF parameter obtained by performing spectrum broadening on the quantized LSF parameter of the primary channel signal based on the target adaptive broadening factor.

The second codeword in the codebook used to quantize the adaptive broadening factor may be determined as the target adaptive broadening factor according to the following several steps.

Step 1. Convert the quantized LSF parameter of the primary channel signal into the LPC.

Step 2. Modify the LPC based on each codeword in the codebook used to quantize the adaptive broadening factor, to obtain a spectrum-broadened LPC corresponding to each codeword.

If N_BITS bits are used to perform quantization encoding on the adaptive broadening factor, the codebook used to quantize the adaptive broadening factor may include $2^{N\_BITS}$ codewords, and the codebook used to quantize the adaptive broadening factor may be represented as $\{\beta_0, \beta_1, \ldots, \beta_{2^{N\_BITS}-1}\}$.

It is assumed that the LPC obtained after converting the quantized LSF parameter of the primary channel signal into the LPC is denoted as $\{a_i\}$, i=1, . . . , M, and M is a linear prediction order.

In this case, a transfer function of a modified linear predictor corresponding to the $n^{th}$ codeword in the $2^{N\_BITS}$ codewords satisfies the following formula:

$$A(z/\beta_n) = \sum_{i=0}^{M} a_i (z/\beta_n)^{-i},$$

where $\alpha_0=1$.

Herein, $a_i$ is the LPC obtained after converting the quantized LSF parameter of the primary channel signal into the LPC, $\beta_n$ is the $n^{th}$ codeword in the codebook used to quantize the adaptive broadening factor, M is a linear prediction order, and n=0,1, . . . , $2^{N\_BITS}-1$.

In this case, spectrum-broadened LPC corresponding to the $n^{th}$ codeword satisfies the following formula:

$$\alpha n'_i = \alpha_i \beta_n^{\,i},$$

where i=1, . . . , or M, and $$\alpha'_0 = 1.$$

Herein, $\alpha_i$ is the LPC obtained after converting the quantized line spectral frequency parameter of the primary channel signal into the LPC, $an'_i$ is the spectrum-broadened LPC corresponding to the $n^{th}$ codeword, $\beta_n$ is the $n^{th}$ codeword in the codebook used to quantize the adaptive broadening factor, M is a linear prediction order, and n=0,1, . . . , $2^{N\_BITS}-1$.

Step 3. Convert the spectrum-broadened LPC corresponding to each codeword into an LSF parameter, to obtain a spectrum-broadened LSF parameter corresponding to each codeword.

For a method for converting the LPC into the LSF parameter, refer to other approaches. Details are not described herein. A spectrum-broadened LSF parameter corresponding to the $n^{th}$ codeword may be denoted as $LSF_{SB\_n}$, and n=0,1, . . . , $2^{N\_BITS}-1$.

Step 4. Calculate a weighted distance between the spectrum-broadened LSF parameter corresponding to each codeword and the line spectral frequency parameter of the secondary channel signal, to obtain a quantized adaptive broadening factor and an intra-predicted vector of the LSF parameter of the secondary channel signal.

A weighted distance between the spectrum-broadened LSF parameter corresponding to the $n^{th}$ codeword and the LSF parameter of the secondary channel signal satisfies the following formula:

$$WD_n^2 = \sum_{i=1}^{M} w_i [LSF_S(i) - LSF_{SB\_n}(i)]^2.$$

Herein, $LSF_{SB\_n}$ is a spectrum-broadened LSF parameter vector corresponding to the $n^{th}$, codeword, $LSF_S$ is an LSF parameter vector of the secondary channel signal, i is a vector index, i=1, . . . , or M, M is a linear prediction order, and $w_i$ is an $i^{th}$ weighting coefficient.

Usually, different linear prediction orders may be set based on different encoding sampling rates. For example, when an encoding sampling rate is 16 kHz, 20-order linear prediction may be performed, that is, M=20. When an encoding sampling rate is 12.8 kHz, 16-order linear prediction may be performed, that is, M=16. An LSF parameter vector may also be briefly referred to as an LSF parameter.

A weighting coefficient may satisfy the following formula:

$$w_i = \left\{ \left[ 1 + \sum_{i=1}^{M} b_i \cdot \cos(2\pi \cdot LSF_S(i)/FS) \right]^2 + \left[ \sum_{i=1}^{M} b_i \cdot \sin(2\pi \cdot LSF_S(i)/FS) \right]^2 \right\}^{-p}.$$

Herein, $b_i$ represents an $i^{th}$ LPC of the secondary channel signal, i=1, . . . , or M, M is a linear prediction order, $LSF_S(i)$ is an $i^{th}$ LSF parameter of the secondary channel signal, and FS is an encoding sampling rate or a sampling rate of linear prediction processing. For example, the sampling rate of linear prediction processing may be 12.8 kHz, and the linear prediction order M is 16.

Weighted distances between spectrum-broadened LSF parameters corresponding to all codewords in the codebook used to quantize the adaptive broadening factor and the LSF parameter of the secondary channel signal may be represented as $\{WD_0^2, WD_1^2, \ldots, WD_{2^{S\_BITS}-1}^2\}$. The weighted distances between the spectrum-broadened LSF parameters corresponding to all the codewords in the codebook used to quantize the adaptive broadening factor and the LSF parameter of the secondary channel signal are searched for a minimum value. A codeword index beta_index corresponding to the minimum value satisfies the following formula:

$$\text{beta\_index} = \arg \min_{0 \le n \le 2^{N\_BITS}-1} (WD_n^2).$$

A codeword corresponding to the minimum value may be used as a quantized adaptive broadening factor, that is:

$$\beta^q=\beta_{beta\_index}.$$

A spectrum-broadened LSF parameter corresponding to the codeword index beta_index may be used as the intra-predicted vector of the LSF parameter of the secondary channel, that is:

$$LSF_{SB}(i)=LSF_{SB\_beta\_index}(i).$$

Herein, $LSF_{SB}$ is the intra-predicted vector of the LSF parameter of the secondary channel signal, $LSF_{SB\_beta\_index}$ is the spectrum-broadened LSF parameter corresponding to the codeword index beta_idex, i=1, . . . , or M, and M is a linear prediction order.

After the intra-predicted vector of the LSF parameter of the secondary channel signal is obtained according to the foregoing steps, the intra-predicted vector of the LSF parameter of the secondary channel signal may be used as the quantized LSF parameter of the secondary channel signal.

Optionally, two-stage prediction may be alternatively performed on the LSF parameter of the secondary channel signal, to obtain the quantized LSF parameter of the secondary channel signal. For an implementation, refer to S740. Details are not described herein again.

It should be understood that, in S520, optionally, multi-stage prediction that is more than two-stage prediction may be alternatively performed on the LSF parameter of the secondary channel signal. Any existing method in other approaches may be used to perform prediction that is more than two-stage prediction, and details are not described herein.

The foregoing content describes how the encoding component 110 obtains, based on the quantized LSF parameter of the primary channel signal and the original LSF parameter of the secondary channel signal, the adaptive broadening factor to be used to determine the quantized LSF parameter of the secondary channel signal on the encoder side, to reduce distortion of the quantized LSF parameter that is of the secondary channel signal and that is determined by the encoder side based on the adaptive broadening factor, in order to reduce a distortion rate of frames.

It should be understood that, after determining the adaptive broadening factor, the encoding component 110 may perform quantization encoding on the adaptive broadening factor, and write the adaptive broadening factor into the bitstream, to transmit the adaptive broadening factor to the decoder side, such that the decoder side can determine the quantized LSF parameter of the secondary channel signal based on the adaptive broadening factor and the quantized LSF parameter of the primary channel signal. This can reduce distortion of the quantized LSF parameter that is of the secondary channel signal and that is obtained by the decoder side, in order to reduce a distortion rate of frames.

Usually, a decoding method used by the decoding component 120 to decode a primary channel signal corresponds to a method used by the encoding component 110 to encode a primary channel signal. Similarly, a decoding method used by the decoding component 120 to decode a secondary channel signal corresponds to a method used by the encoding component 110 to encode a secondary channel signal.

For example, if the encoding component 110 uses an ACELP encoding method, the decoding component 120 needs to correspondingly use an ACELP decoding method. Decoding the primary channel signal by using the ACELP decoding method includes decoding an LSF parameter of the primary channel signal. Similarly, decoding the secondary channel signal by using the ACELP decoding method includes decoding an LSF parameter of the secondary channel signal.

A process of decoding the LSF parameter of the primary channel signal and the LSF parameter of the secondary channel signal may include the following steps decoding the LSF parameter of the primary channel signal to obtain a quantized LSF parameter of the primary channel signal, decoding a reusing determining result of the LSF parameter of the secondary channel signal, and if the reusing determining result is that a reusing determining condition is not met, decoding the LSF parameter of the secondary channel signal to obtain a quantized LSF parameter of the secondary channel signal (this is only an example), or if the reusing determining result is that a reusing determining condition is met, using the quantized LSF parameter of the primary channel signal as a quantized LSF parameter of the secondary channel signal.

If the reusing determining result is that the reusing determining condition is met, the decoding component 120 directly uses the quantized LSF parameter of the primary channel signal as the quantized LSF parameter of the secondary channel signal. This increases distortion of the quantized LSF parameter of the secondary channel signal, thereby increasing a distortion rate of frames.

For the foregoing technical problem that distortion of an LSF parameter of a secondary channel signal is relatively severe, and consequently a distortion rate of frames increases, this disclosure provides a new decoding method.

Figure 10:
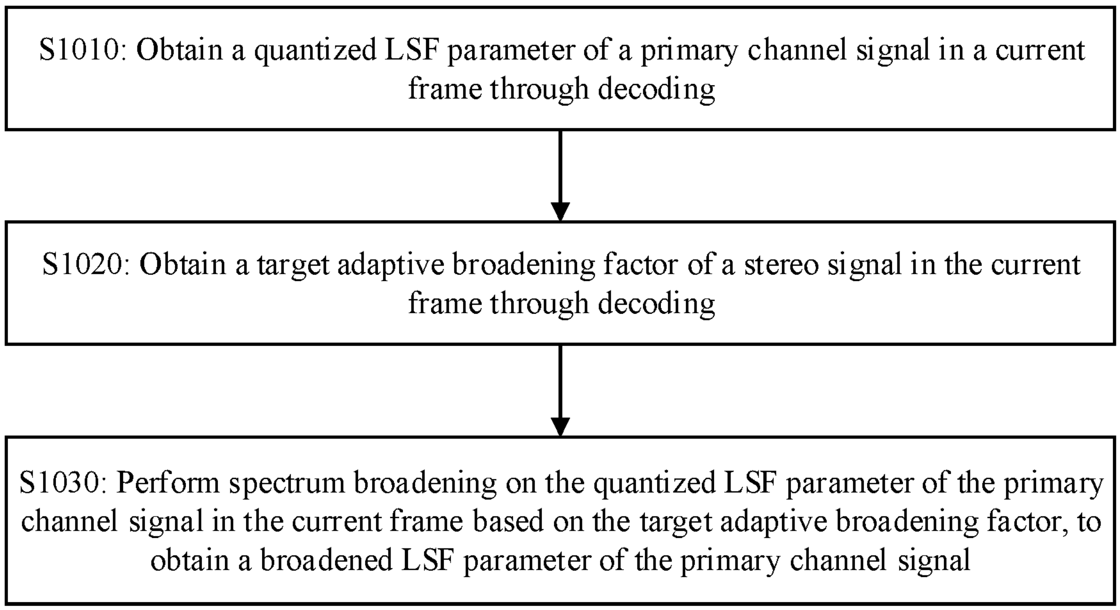
FIG. 10 is a schematic flowchart of a stereo signal decoding method according to an embodiment of this disclosure.

FIG. 10 is a schematic flowchart of a decoding method according to an embodiment of this disclosure. When learning that a reusing determining result is that a reusing condition is met, the decoding component 120 may perform the decoding method shown in FIG. 10.

S1010. Obtain a quantized LSF parameter of a primary channel signal in a current frame through decoding.

For example, the decoding component 120 decodes a received bitstream to obtain an encoding index beta_index of an adaptive broadening factor, and finds, in a codebook based on the encoding index beta_index of the adaptive broadening factor, a codeword corresponding to the encoding index beta_index. The codeword is a target adaptive broadening factor, and is denoted as $\beta^q$, $\beta^q$ satisfies the following formula:

$$\beta^q=\beta_{beta\_index}.$$

Herein, $\beta_{beta\_index}$ is the codeword corresponding to the encoding index beta_index in the codebook.

S1020. Obtain a target adaptive broadening factor of a stereo signal in the current frame through decoding.

S1030. Perform spectrum broadening on the quantized LSF parameter of the primary channel signal in the current frame based on the target adaptive broadening factor, to obtain a broadened LSF parameter of the primary channel signal.

In some possible implementations, the broadened LSF parameter of the primary channel signal may be obtained through calculation according to the following formula:

$$LSF_{SB}(i)=\beta^q\cdot LSF_P(i)+(1-\beta^q)\cdot\overline{LSF_S}(i).$$

Herein, $LSF_{SB}$ is a spectrum-broadened LSF parameter vector of the primary channel signal, $\beta^q$ is a quantized adaptive broadening factor, $LSF_P$ is a quantized LSF parameter vector of the primary channel, $\overline{LSF_S}$ is a mean vector of an LSF parameter of a secondary channel, i is a vector index, i=1, . . . , or M, and M is a linear prediction order.

In some other possible implementations, the performing spectrum broadening on the quantized LSF parameter of the primary channel signal in the current frame based on the target adaptive broadening factor to obtain a broadened LSF parameter of the primary channel signal may include converting the quantized LSF parameter of the primary channel signal, to obtain an LPC, modifying the LPC based on the target adaptive broadening factor, to obtain a modified LPC, and converting the modified LPC to obtain a converted LSF parameter, and using the converted LSF parameter as the broadened LSF parameter of the primary channel signal.

In some possible implementations, the broadened LSF parameter of the primary channel signal is a quantized LSF parameter of the secondary channel signal in the current frame. In other words, the broadened LSF parameter of the primary channel signal may be directly used as the quantized LSF parameter of the secondary channel signal.

In some other possible implementations, the broadened LSF parameter of the primary channel signal is used to determine a quantized LSF parameter of the secondary channel signal in the current frame. For example, two-stage prediction or multi-stage prediction may be performed on the LSF parameter of the secondary channel signal, to obtain the quantized LSF parameter of the secondary channel signal. For example, the broadened LSF parameter of the primary channel signal may be predicted again in a prediction manner in other approaches, to obtain the quantized LSF parameter of the secondary channel signal. For this step, refer to an implementation in the encoding component 110. Details are not described herein again.

In this embodiment of this disclosure, the LSF parameter of the secondary channel signal is determined based on the quantized LSF parameter of the primary channel signal by using a feature that primary channel signals have similar spectral structures and resonance peak locations. Compared with a manner of directly using the quantized LSF parameter of the primary channel signal as the quantized LSF parameter of the secondary channel signal, this can make full use of the quantized LSF parameter of the primary channel signal to improve encoding efficiency, and help reserve a feature of the LSF parameter of the secondary channel signal to reduce distortion of the LSF parameter of the secondary channel signal.

Figure 11:
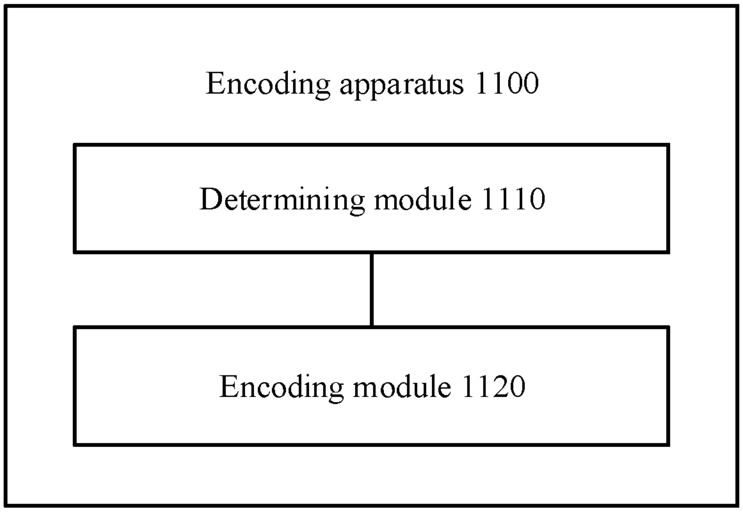
FIG. 11 is a schematic structural diagram of a stereo signal encoding apparatus according to an embodiment of this disclosure.

FIG. 11 is a schematic block diagram of an encoding apparatus 1100 according to an embodiment of this disclosure. It should be understood that the encoding apparatus 1100 is merely an example.

In some implementations, a determining module 1110 and an encoding module 1120 may be included in the encoding component 110 of the mobile terminal 130 or the network element 150.

The determining module 1110 is configured to determine a target adaptive broadening factor based on a quantized LSF parameter of a primary channel signal in a current frame and an LSF parameter of a secondary channel signal in the current frame.

The encoding module 1120 is configured to write the quantized LSF parameter of the primary channel signal in the current frame and the target adaptive broadening factor into a bitstream.

Optionally, the determining module 1110 is configured to calculate an adaptive broadening factor based on the quantized LSF parameter of the primary channel signal and the LSF parameter of the secondary channel signal, where the quantized LSF parameter of the primary channel signal, the LSF parameter of the secondary channel signal, and the adaptive broadening factor satisfy the following relationship:

$$\beta = \frac{\sum_{i=1}^{M} w_i\left[-\overline{LSF}_S^2(i) + LSF_S(i)\overline{LSF}_S(i) - LSF_S(i)LSF_P(i) + \overline{LSF}_S(i)LSF_P(i)\right]}{\sum_{i=1}^{M} w_i\left[-\overline{LSF}_S^2(i) - LSF_P^2(i) + 2\overline{LSF}_S(i)LSF_P(i)\right]},$$

where $LSF_S$ is a vector of the LSF parameter of the secondary channel signal, LSF is a vector of the quantized LSF parameter of the primary channel signal, $\overline{LSF_S}$ is a mean vector of the LSF parameter of the secondary channel signal, i is a vector index, 1≤i≤M, i is an integer, M is a linear prediction order, and w is a weighting coefficient, and quantize the adaptive broadening factor to obtain the target adaptive broadening factor.

Optionally, the determining module 1110 is configured to perform pull-to-average processing on the quantized LSF parameter of the primary channel signal based on the target adaptive broadening factor to obtain a broadened LSF parameter of the primary channel signal, where the pull-to-average processing is performed according to the following formula:

$$LSF_{SB}(i)=\beta^q \cdot LSF_P(i)+(1-\beta^q)\cdot\overline{LSF_S}(i).$$

where $LSF_{SB}$ represents the broadened LSF parameter of the primary channel signal, $LSF_P(i)$ represents a vector of the quantized LSF parameter of the primary channel signal, i represents a vector index, $\beta^q$ represents the target adaptive broadening factor, $\overline{LSF_S}$ represents a mean vector of the LSF parameter of the secondary channel signal, 1≤i≤M, i is an integer, and M represents a linear prediction parameter, and determine the quantized LSF parameter of the secondary channel signal based on the broadened LSF parameter of the primary channel signal.

Optionally, a weighted distance between an LSF parameter obtained by performing spectrum broadening on the quantized LSF parameter of the primary channel signal based on the target adaptive broadening factor and the LSF parameter of the secondary channel signal is the shortest.

Optionally, a weighted distance between an LSF parameter obtained by performing spectrum broadening on the quantized LSF parameter of the primary channel signal based on the target adaptive broadening factor and the LSF parameter of the secondary channel signal is the shortest.

The determining module is configured to obtain, according to the following steps, the LSF parameter obtained by performing spectrum broadening on the quantized LSF parameter of the primary channel signal based on the target adaptive broadening factor converting the quantized LSF parameter of the primary channel signal based on the target adaptive broadening factor, to obtain an LPC, modifying the LPC to obtain a modified LPC, and converting the modified LPC to obtain the LSF parameter obtained by performing spectrum broadening on the quantized LSF parameter of the primary channel signal based on the target adaptive broadening factor.

Optionally, the determining module is further configured to determine a quantized LSF parameter of the secondary channel signal based on the target adaptive broadening factor and the quantized LSF parameter of the primary channel signal.

Optionally, the quantized LSF parameter of the secondary channel signal is an LSF parameter obtained by performing spectrum broadening on the quantized LSF parameter of the primary channel signal based on the target adaptive broadening factor.

Before determining the target adaptive broadening factor based on the quantized LSF parameter of the primary channel signal in the current frame and the LSF parameter of the secondary channel signal in the current frame, the determining module is further configured to determine that the LSF parameter of the secondary channel signal meets a reusing condition.

The encoding apparatus 1100 may be configured to perform the method described in FIG. 5. For brevity, details are not described herein again.

Figure 12:
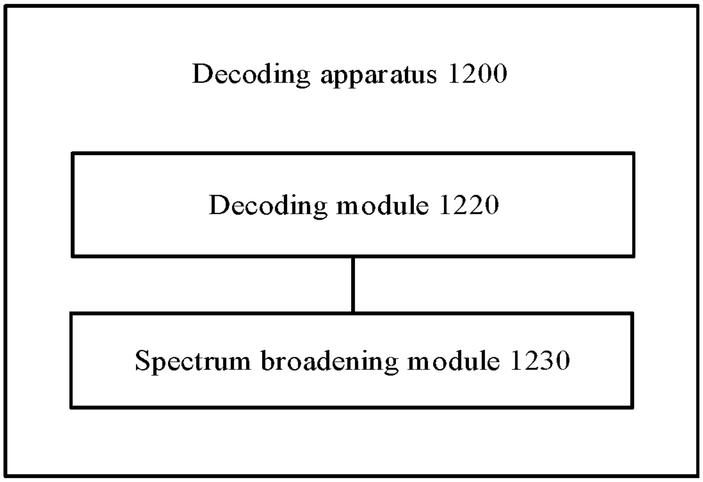
FIG. 12 is a schematic structural diagram of a stereo signal decoding apparatus according to another embodiment of this disclosure.

FIG. 12 is a schematic block diagram of a decoding apparatus 1200 according to an embodiment of this disclosure. It should be understood that the decoding apparatus 1200 is merely an example.

In some implementations, a decoding module 1220 and a spectrum broadening module 1230 may be included in the decoding component 120 of the mobile terminal 140 or the network element 150.

The decoding module 1220 is configured to obtain a quantized LSF parameter of a primary channel signal in the current frame through decoding.

The decoding module 1220 is further configured to obtain a target adaptive broadening factor of a stereo signal in the current frame through decoding.

The spectrum broadening module 1230 is configured to determine a quantized LSF parameter of a secondary channel signal in the current frame based on a broadened LSF parameter of the primary channel signal.

Optionally, the spectrum broadening module 1230 is configured to perform pull-to-average processing on the quantized LSF parameter of the primary channel signal based on the target adaptive broadening factor to obtain the broadened LSF parameter of the primary channel signal, where the pull-to-average processing is performed according to the following formula:

$$LSF_{SB}(i)=\beta^{q}\cdot LSF_{P}(i)+(1-\beta^{q})\cdot\overline{LSF_{S}}(i).$$

Herein, $LSF_{SB}$ represents the broadened LSF parameter of the primary channel signal, $LSF_P(i)$ represents a vector of the quantized LSF parameter of the primary channel signal, i represents a vector index, $\beta^q$ represents the target adaptive broadening factor, SF S represents a mean vector of an LSF parameter of the secondary channel signal, $1\le i\le M$, i is an integer, and M represents a linear prediction parameter.

Optionally, the spectrum broadening module 1230 is configured to convert the quantized LSF parameter of the primary channel signal, to obtain an LPC, modify the LPC based on the target adaptive broadening factor, to obtain a modified LPC, and convert the modified LPC to obtain a converted LSF parameter, and use the converted LSF parameter as the broadened LSF parameter of the primary channel signal.

Optionally, the quantized LSF parameter of the secondary channel signal is the broadened LSF parameter of the primary channel signal.

The decoding apparatus 1200 may be configured to perform the decoding method described in FIG. 10. For brevity, details are not described herein again.

Figure 13:
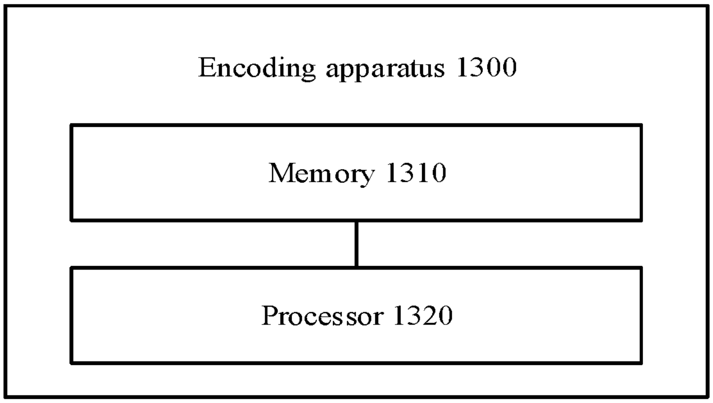
FIG. 13 is a schematic structural diagram of a stereo signal encoding apparatus according to another embodiment of this disclosure.

FIG. 13 is a schematic block diagram of an encoding apparatus 1300 according to an embodiment of this disclosure. It should be understood that the encoding apparatus 1300 is merely an example.

A memory 1310 is configured to store a program.

The processor 1320 is configured to execute the program stored in the memory, and when the program in the memory is executed, the processor 1320 is configured to determine a target adaptive broadening factor based on a quantized LSF parameter of a primary channel signal in a current frame and an LSF parameter of a secondary channel signal in the current frame, and write the quantized LSF parameter of the primary channel signal in the current frame and the target adaptive broadening factor into a bitstream.

Optionally, the processor 1320 is configured to calculate an adaptive broadening factor based on the quantized LSF parameter of the primary channel signal and the LSF parameter of the secondary channel signal, where the quantized LSF parameter of the primary channel signal, the LSF parameter of the secondary channel signal, and the adaptive broadening factor satisfy the following relationship:

$$\beta=\frac{\sum_{i=1}^{M}w_i\left[-\overline{LSF}_S^2(i)+LSF_S(i)\overline{LSF}_S(i)-LSF_S(i)LSF_P(i)+\overline{LSF}_S(i)LSF_P(i)\right]}{\sum_{i=1}^{M}w_i\left[-\overline{LSF}_S^2(i)-LSF_P^2(i)+2\overline{LSF}_S(i)LSF_P(i)\right]},$$

where $LSF_S$ is a vector of the LSF parameter of the secondary channel signal, $LSF_P$ is a vector of the quantized LSF parameter of the primary channel signal, $\overline{LSF_S}$ is a mean vector of the LSF parameter of the secondary channel signal, i is a vector index, $1\le i\le M$, i is an integer, M is a linear prediction order, and w is a weighting coefficient, and quantize the adaptive broadening factor to obtain the target adaptive broadening factor.

Optionally, the processor 1320 is configured to perform pull-to-average processing on the quantized LSF parameter of the primary channel signal based on the target adaptive broadening factor to obtain a broadened LSF parameter of the primary channel signal, where the pull-to-average processing is performed according to the following formula:

$$LSF_{SB}(i)=\beta^{q}\cdot LSF_{P}(i)+(1-\beta^{q})\cdot\overline{LSF_{S}}(i).$$

where $LSF_{SB}$ represents the broadened LSF parameter of the primary channel signal, $LSF_P(i)$ represents a vector of the quantized LSF parameter of the primary channel signal, i represents a vector index, $\beta^q$ represents the target adaptive broadening factor, $\overline{LSF_S}$ represents a mean vector of the LSF parameter of the secondary channel signal, $1\le i\le M$, i is an integer, and M represents a linear prediction parameter, and determine the quantized LSF parameter of the secondary channel signal based on the broadened LSF parameter of the primary channel signal.

Optionally, a weighted distance between an LSF parameter obtained by performing spectrum broadening on the quantized LSF parameter of the primary channel signal based on the target adaptive broadening factor and the LSF parameter of the secondary channel signal is the shortest.

Optionally, a weighted distance between an LSF parameter obtained by performing spectrum broadening on the quantized LSF parameter of the primary channel signal based on the target adaptive broadening factor and the LSF parameter of the secondary channel signal is the shortest.

The processor 1320 is configured to obtain, according to the following steps, the LSF parameter obtained by performing spectrum broadening on the quantized LSF parameter of the primary channel signal based on the target adaptive broadening factor converting the quantized LSF parameter of the primary channel signal based on the target adaptive broadening factor, to obtain an LPC, modifying the LPC to obtain a modified LPC, and converting the modified LPC to obtain the LSF parameter obtained by performing spectrum broadening on the quantized LSF parameter of the primary channel signal based on the target adaptive broadening factor.

Optionally, the quantized LSF parameter of the secondary channel signal is an LSF parameter obtained by performing spectrum broadening on the quantized LSF parameter of the primary channel signal based on the target adaptive broadening factor.

Optionally, before determining the target adaptive broadening factor based on the quantized LSF parameter of the primary channel signal in the current frame and the LSF parameter of the secondary channel signal in the current frame, the processor 1320 is further configured to determine that the LSF parameter of the secondary channel signal meets a reusing condition.

The encoding apparatus 1300 may be configured to perform the encoding method described in FIG. 5. For brevity, details are not described herein again.

Figure 14:
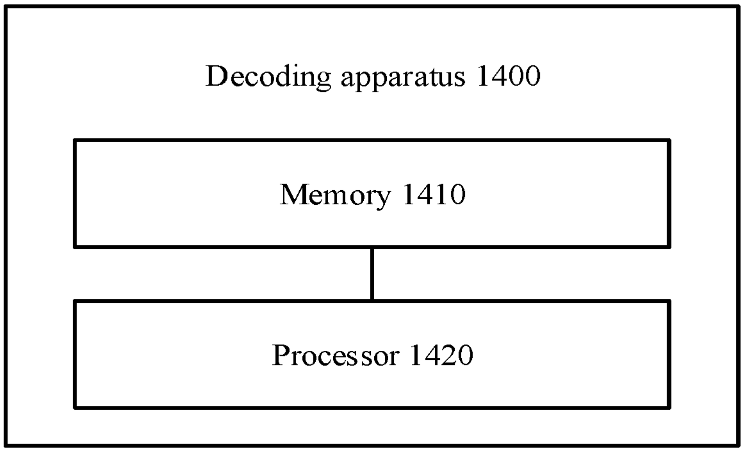
FIG. 14 is a schematic structural diagram of a stereo signal decoding apparatus according to another embodiment of this disclosure.

FIG. 14 is a schematic block diagram of a decoding apparatus 1400 according to an embodiment of this disclosure. It should be understood that the decoding apparatus 1400 is merely an example.

A memory 1410 is configured to store a program.

The processor 1420 is configured to execute the program stored in the memory, and when the program in the memory is executed, the processor 1420 is configured to obtain a quantized LSF parameter of a primary channel signal in a current frame through decoding, obtain a target adaptive broadening factor of a stereo signal in the current frame through decoding, and determine a quantized LSF parameter of a secondary channel signal in the current frame based on a broadened LSF parameter of the primary channel signal.

Optionally, the processor 1420 is configured to perform pull-to-average processing on the quantized LSF parameter of the primary channel signal based on the target adaptive broadening factor to obtain the broadened LSF parameter of the primary channel signal, where the pull-to-average processing is performed according to the following formula:

$$LSF_{SB}(i)=\beta^q\cdot LSF_P(i)+(1-\beta^q)\cdot\overline{LSF_S}(i).$$

Herein, $LSF_{SB}$ represents the broadened LSF parameter of the primary channel signal, $LSF_P(i)$ represents a vector of the quantized LSF parameter of the primary channel signal, i represents a vector index, $\beta^q$ represents the target adaptive broadening factor, $\overline{LSF_S}$ represents a mean vector of an LSF parameter of the secondary channel signal, $1\le i\le M$, i is an integer, and M represents a linear prediction parameter.

Optionally, the processor 1420 is configured to convert the quantized LSF parameter of the primary channel signal, to obtain an LPC, modify the LPC based on the target adaptive broadening factor, to obtain a modified LPC, and convert the modified LPC to obtain a converted LSF parameter, and use the converted LSF parameter as the broadened LSF parameter of the primary channel signal.

Optionally, the quantized LSF parameter of the secondary channel signal is the broadened LSF parameter of the primary channel signal.

The decoding apparatus 1400 may be configured to perform the decoding method described in FIG. 10. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular disclosures and design constraint conditions of the technical solutions. A person skilled in the art may use different methods to implement the described functions for each particular disclosure, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this disclosure, it should be understood that the disclosed system, apparatus, and method may be implemented in another manner. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on an actual requirement to achieve the objectives of the solutions of the embodiments.

In addition, function units in the embodiments of this disclosure may be integrated into one processing unit, or each of the units may exist alone physically, or two or more units may be integrated into one unit.

It should be understood that, the processor in the embodiments of this disclosure may be a central processing unit (CPU). The processor may alternatively be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

When the functions are implemented in a form of a software function unit and sold or used as an independent product, the functions may be stored in a computer-readable storage medium. Based on such an understanding, the technical solutions of this disclosure essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this disclosure. The foregoing storage medium includes any medium that can store program code, such as a Universal Serial Bus (USB) flash drive, a removable hard disk, a read-only memory (ROM), a random-access memory (RAM), a magnetic disk, or a compact disc.

The foregoing descriptions are merely implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An audio signal encoding method, comprising:

obtaining a current frame of an audio signal, wherein the current frame comprises a first channel signal and a second channel signal;

obtaining an inter-channel time difference (ITD) between the first channel signal and the second channel signal;

performing time alignment on the first channel signal and the second channel signal based on the ITD to respectively obtain a time-aligned first channel signal and a time-aligned second channel signal;

performing a time-domain downmixing on the time-aligned first channel signal and the time-aligned second channel signal to respectively obtain a third channel signal and a fourth channel signal;

obtaining a first quantized line spectral frequency (LSF) vector of the third channel signal;

obtaining a second LSF vector of the fourth channel signal;

calculating a second adaptive broadening factor based on the first quantized LSF vector and the second LSF vector;

obtaining a first adaptive broadening factor by quantizing the second adaptive broadening factor; and writing the first quantized LSF vector and the first adaptive broadening factor into a bitstream, wherein the first quantized LSF vector, the second LSF vector, and the second adaptive broadening factor satisfy a first equation comprising:

$$\beta = \frac{\sum_{i=1}^{M} w_i\left[-\overline{LSF}_S^2(i) + LSF_S(i)\overline{LSF}_S(i) - LSF_S(i)LSF_P(i) + \overline{LSF}_S(i)LSF_P(i)\right]}{\sum_{i=1}^{M} w_i\left[-\overline{LSF}_S^2(i) - LSF_P^2(i) + 2\overline{LSF}_S(i)LSF_P(i)\right]},$$

wherein β represents the second adaptive broadening factor, wherein $LSF_S$ represents the second LSF vector, wherein $LSF_P$ represents the first quantized LSF vector, wherein $\overline{LSF}_S$ represents a mean vector associated with the second LSF vector, wherein i represents a vector index and is an integer, wherein 1≤i≤M, wherein M is a linear prediction order, and wherein w is a weighting coefficient.

2. The audio signal encoding method of claim 1, further comprising obtaining a second quantized LSF vector of the fourth channel signal based on the first adaptive broadening factor and the first quantized LSF vector.

3. The audio signal encoding method of claim 2, further comprising:

performing pull-to-average processing on the first quantized LSF vector based on the first adaptive broadening factor to obtain a broadened LSF vector of the third channel signal; and further obtaining the second quantized LSF vector based on the broadened LSF vector.

4. The audio signal encoding method of claim 3, further comprising performing the pull-to-average processing according to a second equation comprising:

$$LSF_{SB}(i)=\beta^q \cdot LSF_P(i)+(1-\beta^q)\cdot\overline{LSF}_S(i)$$

wherein $LSF_{SB}$ represents the broadened LSF vector, and wherein $\beta^q$ represents the first adaptive broadening factor.

5. The audio signal encoding method of claim 1, wherein the second LSF vector meets a reusing condition when a distance between an LSF vector of the third channel signal and the second LSF vector of the fourth channel signal is less than or equal to a threshold.

6. An audio signal encoding apparatus, comprising:

a processor; and a memory coupled to the processor and configured to store programming instructions for execution by the processor to cause the audio signal encoding apparatus to:

obtain a current frame of an audio signal, wherein the current frame comprises a first channel signal and a second channel signal;

obtain an inter-channel time difference (ITD) between the first channel signal and the second channel signal;

perform time alignment on the first channel signal and the second channel signal based on the ITD to respectively obtain a time-aligned first channel signal and a time-aligned second channel signal;

perform a time-domain downmixing on the time-aligned first channel signal and the time-aligned second channel signal to respectively obtain a third channel signal and a fourth channel signal;

obtain a first quantized line spectral frequency (LSF) vector of the third channel signal;

obtain a second LSF vector of the fourth channel signal;

calculate a second adaptive broadening factor based on the first quantized LSF vector and the second LSF vector;

obtain a first adaptive broadening factor by quantizing the second adaptive broadening factor; and write the first quantized LSF vector and the first adaptive broadening factor into a bitstream, wherein the first quantized LSF vector, the second LSF vector, and the second adaptive broadening factor satisfy a first equation comprising:

$$\beta = \frac{\sum_{i=1}^{M} w_i\left[-\overline{LSF}_S^2(i) + LSF_S(i)\overline{LSF}_S(i) - LSF_S(i)LSF_P(i) + \overline{LSF}_S(i)LSF_P(i)\right]}{\sum_{i=1}^{M} w_i\left[-\overline{LSF}_S^2(i) - LSF_P^2(i) + 2\overline{LSF}_S(i)LSF_P(i)\right]},$$

wherein β represents the second adaptive broadening factor, wherein $LSF_S$ represents the second LSF vector, wherein $LSF_P$ represents the first quantized LSF vector, wherein $\overline{LSF}_S$ represents a mean vector associated with the second LSF vector, wherein i is a vector index and is an integer, wherein 1≤i≤M, wherein M is a linear prediction order, and wherein w is a weighting coefficient.

7. The audio signal encoding apparatus of claim 6, wherein the programming instructions for execution by the processor further cause the audio signal encoding apparatus to obtain a second quantized LSF vector of the fourth channel signal based on the first adaptive broadening factor and the first quantized LSF vector.

8. The audio signal encoding apparatus of claim 7, wherein the programming instructions for execution by the processor further cause the audio signal encoding apparatus to:

perform pull-to-average processing on the first quantized LSF vector based on the first adaptive broadening factor to obtain a broadened LSF vector of the third channel signal; and further obtain the second quantized LSF vector based on the broadened LSF vector.

9. The audio signal encoding apparatus of claim 8, wherein the programming instructions for execution by the processor further cause the audio signal encoding apparatus to:

perform the pull-to-average processing according to a second equation comprising:

$$LSF_{SB}(1)=\beta^q\cdot LSF_P(i)+(1-\beta^q)\cdot LSF_S(i),$$

wherein $LSF_{SB}$ represents the broadened LSF vector, and wherein $\beta^q$ represents the first adaptive broadening factor.

10. The audio signal encoding apparatus of claim 6, wherein the second LSF vector meets a reusing condition when a distance between an LSF vector of the third channel signal and the second LSF vector of the fourth channel signal is less than or equal to a threshold.

11. A computer program product comprising computer-executable instructions that are stored on a non-transitory computer-readable medium and that, when executed by a processor, cause an audio signal encoding apparatus to:

obtain a current frame of an audio signal, wherein the current frame comprises a first channel signal and a second channel signal;

obtain an inter-channel time difference (ITD) between the first channel signal and the second channel signal;

perform time alignment on the first channel signal and the second channel signal based on the ITD to respectively obtain a time-aligned first channel signal and a time-aligned second channel signal;

perform a time-domain downmixing on the time-aligned first channel signal and the time-aligned second channel signal to respectively obtain a third channel signal and a fourth channel signal;

obtain a first quantized line spectral frequency (LSF) vector of the third channel signal;

obtain a second LSF vector of the fourth channel signal;

calculate a second adaptive broadening factor based on the first quantized LSF vector and the second LSF vector;

obtain a first adaptive broadening factor by quantizing the second adaptive broadening factor; and write the first quantized LSF vector and the first adaptive broadening factor into a bitstream;

wherein the first quantized LSF vector, the second LSF vector, and the second adaptive broadening factor satisfy a first equation comprising:

$$\beta=\frac{\sum_{i=1}^{M} w_i\left[-\overline{LSF}_S^2(i)+LSF_S(i)\overline{LSF}_S(i)-LSF_S(i)LSF_P(i)+\overline{LSF}_S(i)LSF_P(i)\right]}{\sum_{i=1}^{M} w_i\left[-\overline{LSF}_S^2(i)-LSF_P^2(i)+2\overline{LSF}_S(i)LSF_P(i)\right]},$$

wherein β represents the second adaptive broadening factor, wherein $LSF_S$ represents the second LSF vector, wherein $LSF_P$ represents the first quantized LSF vector, wherein $\overline{LSF_S}$represents a mean vector associated with the second LSF vector, wherein i is a vector index and is an integer, wherein 1≤i≤M, wherein M is a linear prediction order, and wherein w is a weighting coefficient.

12. The computer program product of claim 11, wherein the computer-executable instructions, when executed by the processor, further cause the audio signal encoding apparatus to obtain a second quantized LSF vector of the fourth channel signal based on the first adaptive broadening factor and the first quantized LSF vector.

13. The computer program product of claim 12, wherein the computer-executable instructions, when executed by the processor, further cause the audio signal encoding apparatus to:

perform pull-to-average processing on the first quantized LSF vector based on the first adaptive broadening factor to obtain a broadened LSF vector of the third channel signal; and further obtain the second quantized LSF vector based on the broadened LSF vector.

14. The computer program product of claim 13, wherein the computer-executable instructions, when executed by the processor, further cause the audio signal encoding apparatus to perform the pull-to-average processing according to a second equation comprising:

$$LSF_{SB}(i)=\beta^q\cdot LSF_P(i)+(1-\beta^q)\cdot LSF_S(i)$$

wherein $LSF_{SB}$ represents the broadened LSF vector, $LSF_P$ and wherein $\beta^q$ represents the first adaptive broadening factor $\overline{LSF_S}$.

15. The computer program product of claim 11, wherein the second LSF vector meets a reusing condition when a distance between an LSF vector of the third channel signal and the second LSF vector of the fourth channel signal is less than a threshold.

16. The computer program product of claim 15, wherein the computer-executable instructions, when executed by the processor, further cause the audio signal encoding apparatus to further write an indication of not to perform quantization encoding on the second LSF vector when the distance is less than the threshold.

17. The computer program product of claim 11, wherein the second LSF vector meets a reusing condition when a distance between an LSF vector of the third channel signal and the second LSF vector of the fourth channel signal is equal to a threshold.

18. The computer program product of claim 17, wherein the computer-executable instructions, when executed by the processor, further cause the audio signal encoding apparatus to further write an indication of not to perform quantization encoding on the second LSF vector when the distance is equal to the threshold.

19. The audio signal encoding method of claim 5, further comprising further writing an indication of not to perform quantization encoding on the second LSF vector when the distance is less than or equal to the threshold.

20. The audio signal encoding apparatus of claim 10, wherein the programming instructions for execution by the processor further cause the audio signal encoding apparatus to further write an indication of not to perform quantization encoding on the second LSF vector when the distance is less than or equal to the threshold.

* * * * *